US012641571B2

(12) United States Patent
Wang et al.

(10) Patent No.: US 12,641,571 B2
(45) Date of Patent: May 26, 2026

(54) COMMUNICATION METHOD AND APPARATUS

(71) Applicant: Huawei Technologies Co., Ltd., Shenzhen (CN)

(72) Inventors: Nanxin Wang, Shanghai (CN); Wenjie Peng, Shanghai (CN); Jun Wang, Shanghai (CN); Xiangyu Li, Shanghai (CN); Mingzeng Dai, Shenzhen (CN); Xiaodan Pan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 523 days.

(21) Appl. No.: 18/070,193

(22) Filed: Nov. 28, 2022

(65) Prior Publication Data

US 2023/0093649 A1     Mar. 23, 2023

Related U.S. Application Data

(63) Continuation of application No. PCT/CN2021/095337, filed on May 21, 2021.

(30) Foreign Application Priority Data

May 29, 2020   (CN) .......................... 202010474231.1
May 6, 2021    (CN) .......................... 202110492290.6

(51) Int. Cl.
  *H04W 68/02*       (2009.01)
  *H04W 8/00*        (2009.01)
      (Continued)

(52) U.S. Cl.
  CPC ......... *H04W 68/025* (2013.01); *H04W 8/005* (2013.01); *H04W 52/0229* (2013.01);
      (Continued)

(58) Field of Classification Search
  CPC .............. H04W 68/025; H04W 8/005; H04W 52/0229; H04W 72/044; H04W 88/04;
      (Continued)

(56) References Cited

U.S. PATENT DOCUMENTS 11,102,754 B2 *   8/2021   Martin .............. H04W 52/0229
11,229,007 B2     1/2022   Yang
      (Continued)

FOREIGN PATENT DOCUMENTS

CN         108616830 A     10/2018
CN         109314950 A     2/2019
      (Continued)

OTHER PUBLICATIONS

Huawei, HiSilicon, "Solution on Paging," SA WG2 Meeting #122, San Jose del Cabo, Mexico, Jun. 26-30, 2017, S2-175226, 9 pages.
      (Continued)

*Primary Examiner* — Mazda Sabouri
(74) *Attorney, Agent, or Firm* — Slater Matsil, LLP

(57)             ABSTRACT
This application relates to the field of communication technologies, and discloses a communication method and an apparatus. The method includes: A relay terminal receives first identifier information from a remote terminal, where when the remote terminal is in an idle state, the first identifier information includes an S-TMSI of the remote terminal, and when the remote terminal is in an inactive state, the first identifier information includes an I-RNTI of the remote terminal. When the relay terminal obtains, through monitoring, a first paging message including the first identifier information, sending, by the relay terminal, the first paging message to the remote terminal or sending first indication information to the remote terminal, where the first indication information indicates that the remote terminal is paged.

8 Claims, 10 Drawing Sheets

(51) Int. Cl.

| | |
|---|---|
| *H04W 52/02* | (2009.01) |
| *H04W 72/044* | (2023.01) |
| *H04W 76/28* | (2018.01) |
| *H04W 88/04* | (2009.01) |

(52) U.S. Cl.

CPC ......... *H04W 72/044* (2013.01); *H04W 88/04* (2013.01); *H04W 76/28* (2018.02)

(58) Field of Classification Search

CPC ..... H04W 76/28; H04W 76/11; H04W 76/27; H04W 92/18; H04W 68/00

See application file for complete search history.

(56) References Cited

U.S. PATENT DOCUMENTS

| | | | | |
|---|---|---|---|---|
| 2019/0373578 | A1* | 12/2019 | Hong | H04W 76/28 |
| 2019/0387498 | A1* | 12/2019 | Li | H04W 40/12 |
| 2020/0015192 | A1* | 1/2020 | Chun | H04W 76/27 |
| 2020/0053821 | A1 | 2/2020 | Shih et al. | |
| 2020/0068380 | A1* | 2/2020 | Wallentin | H04W 76/14 |
| 2020/0092845 | A1 | 3/2020 | Cai et al. | |
| 2020/0322919 | A1* | 10/2020 | Wu | H04W 68/02 |
| 2022/0418000 | A1* | 12/2022 | Zhang | H04L 5/0094 |
| 2023/0026316 | A1* | 1/2023 | Chen | H04W 68/00 |
| 2023/0084017 | A1* | 3/2023 | Wang | H04W 76/27 |
| | | | | 370/311 |

FOREIGN PATENT DOCUMENTS

| | | |
|---|---|---|
| WO | 2016019528 A1 | 2/2016 |
| WO | 2018112708 A1 | 6/2018 |
| WO | 2018137284 A1 | 8/2018 |
| WO | 2018164821 A1 | 9/2018 |
| WO | 2018195917 A1 | 11/2018 |
| WO | 2018196066 A1 | 11/2018 |
| WO | 2018223401 A1 | 12/2018 |

OTHER PUBLICATIONS

"3rd Generation Partnership Project; Technical Specification Group Services and System Aspects; Study on Architecture Enhancements to ProSe UE-to-Network Relay (Release 15)," 3GPP TR 23.733 V15.1.0, Dec. 2012, 81 pages.

"3rd Generation Partnership Project; Technical Specification Group Radio Access Network; Study on further enhancements to LTE Device to Device (D2D), User Equipment (UE) to network relays for Internet of Things (IoT) and wearables; (Release 15)," 3GPP TR 36.746 V15.1.1, Apr. 2018, 55 pages.

"3rd Generation Partnership Project; Technical Specification Group Radio Access Network; NR; User Equipment (UE) procedures in Idle mode and RRC Inactive state (Release 15)," 3GPP TS 38.304 V15.3.0, Mar. 2019, 29 pages.

"3rd Generation Partnership Project; Technical Specification Group Radio Access Network; NR; Radio Resource Control (RRC) protocol specification (Release 16)," 3GPP TS 38.331 V16.0.0, Mar. 2020, 835 pages.

"Procedures for remote or relay UE in idle mode," Agenda Item: 8.4.2.1, Source: Huawei, HiSilicon, Document for: Discussion, S3GPP TSG RAN WG2 Meeting #95bis, R2-166914, Kaohsiung, Oct. 10-14, 2016, 7 pages.

"Discussion on the pairing, paging and system info acquisition of remote UE," Source: ZTE, Agenda item: 8.4.2.2, Document for: Discussion and Approval, 3GPP TSG-RAN WG2 Meeting #96, R2-168170, Reno, USA, Nov. 14-18, 2016, 5 pages.

"Paging and Idle mode mobility for OoC Remote UE," Agenda item: 8.4.2.2, Source: Nokia, Alcatel-Lucent Shanghai Bell, WID/SID: FS_feD2D_IoT_relay_wearable, Document for: Discussion and Decision, 3GPP TSG-RAN WG2 Meeting #96, R2-168398, Reno, USA, Nov. 14-18, 2016, 2 pages.

"Paging via Relay," Agenda Item: 8.4.2.2, Source: Sony, Document for: Discussion, 3GPP TSG RAN WG2 Meeting #96, R2-168547, Reno, USA, Nov. 14-18, 2016, 4 pages.

"TP for paging support in FeD2D," Agenda item: 8.4.2.2, Source: Intel Corporation, Document for: Discussion and decision, 3GPP TSG RAN WG2 Meeting #96, R2-168673, Reno, USA, Nov. 14-18, 2016, 3 pages.

* cited by examiner

RRC connected state

Resume/
Temporarily
release

Setup/Release

RRC inactive state

Release

RRC idle state

1100

1300

COMMUNICATION METHOD AND APPARATUS

CROSS-REFERENCE TO RELATED APPLICATIONS

This application is a continuation of International Application No. PCT/CN2021/095337, filed on May 21, 2021, which claims priority to Chinese Patent Application No. 202010474231.1, filed on May 29, 2020 and Chinese Patent Application No. 202110492290.6, filed on May 6, 2021. All of the aforementioned patent applications are hereby incorporated by reference in their entireties.

TECHNICAL FIELD

Embodiments of this application relate to the field of communications technologies, and in particular, to a communication method and an apparatus.

BACKGROUND

With development of communication technologies, new radio (NR) proposes a user-to-network (U2N) relay communication scenario. In the U2N relay communication scenario, a terminal (remote terminal) that has poor communication quality with a network device or is out of a service range of a network device may communicate with the network device by using a terminal (relay terminal) that has a relay function and is within the service range of the network device, so that a communication range and communication quality are improved.

However, the remote terminal may be in an idle state or an inactive state, and is disconnected from the network device. Because the remote terminal is out of the service range of the network device or has the poor communication quality with the network device, when data, a voice, or the like needs to be transmitted on the network side, a paging message sent by a network side cannot be received by the remote terminal and the remote terminal cannot establish a connection to the network device. Therefore, a communication solution is needed, to ensure that the network side can normally initiate paging to the remote terminal.

SUMMARY

Embodiments of this application provide a communication method and an apparatus, to ensure that a network side (including a network device side and a core network device side) can normally initiate paging to a remote terminal when the remote terminal communicates with a network device by using a relay terminal.

According to a first aspect, an embodiment of this application provides a communication method. The method includes: A relay terminal receives first identifier information from a remote terminal, where when the remote terminal is in an idle state, the first identifier information includes an S-temporary mobile subscriber identity S-TMSI of the remote terminal, and when the remote terminal is in an inactive state, the first identifier information includes an inactive radio network temporary identifier I-RNTI of the remote terminal. When the relay terminal obtains, through monitoring, a first paging message including the first identifier information, sending, by the relay terminal, the first paging message to the remote terminal or sending first indication information to the remote terminal, where the first indication information indicates that the remote terminal is paged.

In this embodiment of this application, the described communication method may be implemented by the relay terminal, or may be implemented by a component in the relay terminal, for example, a component such as a processing chip or a circuit in the relay terminal. According to the foregoing method, in a case that the remote terminal communicates with a network device by using the relay terminal, when being in the idle state, the remote terminal may report the first identifier information including the S-TMSI of the remote terminal to the relay terminal, and when being in the inactive state, the remote terminal may report the first identifier information including the I-RNTI of the remote terminal to the relay terminal, so that the relay terminal may monitor, based on the first identifier information of the remote terminal, the first paging message including the first identifier information of the remote terminal, and when obtaining the first paging message of the remote terminal through monitoring, notify that the remote terminal is paged. Therefore, the remote terminal can be normally paged by a network side (including a network device side and a core network device side) when the remote terminal is in the idle state and the inactive state and is disconnected from the network device, so that communication reliability is improved.

In a possible design, the method further includes: The relay terminal monitors the first paging message on a first paging occasion PO of a first paging frame PF of the remote terminal, where the relay terminal determines the first PF and the first PO of the remote terminal based on a serving cell parameter of the relay terminal, the S-TMSI of the remote terminal, and a specific discontinuous reception DRX cycle of the remote terminal.

In a possible design, the method further includes: The relay terminal monitors the first paging message on a first PO of a first PF of the remote terminal, where the relay terminal sends a serving cell parameter of the relay terminal to the remote terminal; and the relay terminal receives the first PF and the first PO of the remote terminal that are sent by the remote terminal, where the first PF and the first PO of the remote terminal are determined by the remote terminal based on the serving cell parameter of the relay terminal, the S-TMSI of the remote terminal, and a specific DRX cycle of the remote terminal. Alternatively, the relay terminal sends the S-TMSI of the remote terminal and a specific DRX cycle of the remote terminal to a second network device corresponding to the relay terminal, and receives a first PF and a first PO of the remote terminal that are sent by the second network device, where the first PF and the first PO of the remote terminal are determined by the second network device based on the serving cell parameter of the relay terminal, the S-TMSI of the remote terminal, and the specific DRX cycle of the remote terminal.

In the foregoing design, the relay terminal may monitor the first paging message of the remote terminal on the first PO of the first PF of the remote terminal, and a network for paging the remote terminal does not need to be changed, so that it can be ensured that the network side can normally initiate paging to the remote terminal.

In a possible design, the method further includes: The relay terminal sends the first PF and the first PO to a second network device corresponding to the relay terminal.

In the foregoing design, the relay terminal sends the first PF and the first PO of the remote terminal to the second network device. This helps the second network device corresponding to the relay terminal skip performing data scheduling on the relay terminal on the first PO of the first PF after the second network device corresponding to the relay terminal learns of the first paging message of the remote terminal monitored by the relay terminal on the first PF and the first PO of the remote terminal, and avoids a conflict between monitoring the first paging message of the remote terminal by the relay terminal and performing data scheduling (for example, downlink service scheduling) on the relay terminal by the second network device.

In a possible design, when no data scheduling is performed on the first PO of the first PF, the relay terminal monitors the first paging message on the first PO of the first PF.

In the foregoing design, the relay terminal monitors the first paging message on the first PO of the first PF only when no data scheduling is performed on the first PO of the first PF. This helps avoid a conflict between monitoring the first paging message of the remote terminal by the relay terminal and performing data scheduling (downlink service scheduling) on the relay terminal by the second network device.

In a possible design, when the relay terminal is in a radio resource control RRC connected state and an active BWP does not cover an initial BWP, before that the relay terminal monitors the first paging message on a first PO of a first PF of the remote terminal, the method further includes: The relay terminal switches a configured BWP from the active BWP to the initial BWP.

The paging message is usually delivered on the initial (initial) BWP. In the foregoing design, this helps avoid a case in which the relay terminal cannot obtain the paging message of the remote terminal through monitoring because the BWP configured for the relay terminal does not cover the initial BWP.

In a possible design, that the relay terminal switches a configured BWP from the active BWP to the initial BWP includes: The relay terminal switches the configured BWP from the active BWP to the initial BWP in advance based on BWP switching duration.

In the foregoing design, this helps avoid a problem that the relay terminal cannot obtain the paging message of the remote terminal through monitoring due to a BWP switching delay.

In a possible design, before that the relay terminal switches a configured BWP from the active BWP to the initial BWP, the method further includes:

The relay terminal sends BWP switching duration of the relay terminal to the second network device corresponding to the relay terminal.

In the foregoing design, this helps the second network device learn of the BWP switching duration of the relay terminal before the first PO of the first PF, and avoids a data loss caused by performing data scheduling on the relay terminal within the BWP switching duration before the first PO of the first PF.

In a possible design, the relay terminal monitors the first paging message on a second PO of a second PF of the relay terminal, and the method further includes: The relay terminal sends the first identifier information to a second core network device corresponding to the relay terminal.

In the foregoing design, the relay terminal reports the first identifier information of the remote terminal to the corresponding second core network device. This helps the core network learn of a connection relationship between the remote terminal and the relay terminal. The remote terminal is paged on the second PO of the second PF of the relay terminal through modifications on the core network. The relay terminal in a power saving state only needs to wake up on the second PO of the second PF to monitor a paging message, including a paging message of the relay terminal and a paging message of the remote terminal, so that power overheads are reduced.

In a possible design, that the relay terminal sends the first paging message to the remote terminal includes: The relay terminal sends the first paging message to the remote terminal in a form of broadcast, multicast, or unicast.

In the foregoing design, the relay terminal may send the first paging message to the remote terminal in a corresponding sending form and based on requirements. This helps meet communication requirements in different communication scenarios, and improve communication reliability.

In a possible design, the first paging message is a PC5-RRC message or a PC5-S message. Alternatively, the first paging message is carried in a PC5-RRC message or a PC5-S message. The first indication information is sent by using PC5 MAC CE information, the PC5-RRC message, or the PC5-S message.

In the foregoing design, the first paging message or the first indication information transmitted between the relay terminal and the remote terminal may be sent or carried over a PC5 interface-based communication link between the relay terminal and the remote terminal, so that reliability of the transmitted first paging message or the transmitted first indication information is ensured.

According to a second aspect, an embodiment of this application provides a communication method. The method includes: A remote terminal sends first identifier information of the remote terminal to a relay terminal, where when the remote terminal is in an idle state, the first identifier information includes an S-temporary mobile subscriber identity S-TMSI of the remote terminal, and when the remote terminal is in an inactive state, the first identifier information includes an inactive radio network temporary identifier I-RNTI of the remote terminal. The remote terminal receives a first paging message that is sent by the relay terminal and that includes the first identifier information, or receives a first indication information from the relay terminal, where the first indication information indicates that the remote terminal is paged.

In this embodiment of this application, the described communication method may be implemented by the remote terminal, or may be implemented by a component in the remote terminal, for example, a component such as a processing chip or a circuit in the remote terminal. According to the foregoing method, in a case that the remote terminal communicates with a network device by using the relay terminal, when being in the idle state, the remote terminal may report the first identifier information including the S-TMSI of the remote terminal to the relay terminal, and when being in the inactive state, the remote terminal may report the first identifier information including the I-RNTI of the remote terminal to the relay terminal, so that the relay terminal may monitor, based on the first identifier information of the remote terminal, the first paging message including the first identifier information of the remote terminal, and when obtaining the first paging message of the remote terminal through monitoring, notify that the remote terminal is paged. Therefore, the remote terminal can be normally paged by a network side (including a network device side and a core network device side) when the remote terminal is in the idle state and the inactive state and is disconnected from the network device, so that communication reliability is improved.

In a possible design, the method further includes: The remote terminal receives a serving cell parameter from the relay terminal. The remote terminal sends a first paging frame PF and a first paging occasion PO of the remote terminal to the relay terminal, where the first PF and the first PO of the remote terminal are determined by the remote terminal based on the serving cell parameter of the relay terminal, the S-TMSI of the remote terminal, and a specific DRX cycle of the remote terminal.

In the foregoing design, the remote terminal may send the first PF and the first PO of the remote terminal to the relay terminal, the relay terminal may monitor the first paging message of the remote terminal on the first PO of the first PF of the remote terminal, and a network for paging the remote terminal does not need to be changed, so that it can be ensured that the network side can normally initiate paging to the remote terminal.

In a possible design, the method further includes: The remote terminal sends the S-TMSI of the remote terminal and/or the specific DRX cycle of the remote terminal to the relay terminal, used by the relay terminal to calculate the first paging frame PF and the first paging occasion PO of the remote terminal, or used by the relay terminal to send the S-TMSI of the remote terminal and/or the specific DRX cycle of the remote terminal to the second network device.

In a possible design, that the remote terminal receives a first paging message that is sent by the relay terminal and that includes the first identifier information includes: The remote terminal receives, in a form of broadcast, multicast, or unicast, the first paging message that is sent by the relay terminal and that includes the first identifier information.

In the foregoing design, the relay terminal may send the first paging message to the remote terminal in a corresponding sending form and based on requirements. This helps meet communication requirements in different communication scenarios, and improve communication reliability.

In a possible design, the first paging message is a PC5-RRC message or a PC5-S message. Alternatively, the first paging message is carried in a PC5-RRC message or a PC5-S message. The first indication information is sent by using PC5 MAC CE information, the PC5-RRC message, or the PC5-S message.

In the foregoing design, the first paging message or the first indication information transmitted between the relay terminal and the remote terminal may be sent or carried over a PC5 interface-based communication link between the relay terminal and the remote terminal, so that reliability of the transmitted first paging message or the transmitted first indication information is ensured.

According to a third aspect, an embodiment of this application provides a communication method. The method includes: A second core network device receives a third paging message that is sent by a first core network device and that includes first identifier information of a remote terminal, where when the remote terminal is in an idle state, the first identifier information includes an S-temporary mobile subscriber identity S-TMSI of the remote terminal, and when the remote terminal is in an inactive state, the first identifier information includes an inactive radio network temporary identifier I-RNTI of the remote terminal. The second core network device sends a second paging message including the first identifier information and second identifier information of a relay terminal to a second network device, where the second network device is a network device corresponding to the relay terminal, and the second identifier information includes at least one of an S-TMSI or an I-RNTI of the relay terminal.

In this embodiment of this application, the described communication method may be implemented by the second core network device, or may be implemented by a component in the second core network device, for example, a component such as a processing chip or a circuit in the second core network device. According to the foregoing method, the first core network device corresponding to the remote terminal may learn of a connection relationship between the remote terminal and the relay terminal, and the relay terminal initiates paging to the remote terminal, so that it can be ensured that when communicating with the network device by using the relay terminal, the remote terminal can be normally paged by a network side when the remote terminal is in the idle state and the inactive state and is disconnected from the network device. This improves communication reliability.

In a possible design, the method further includes: The second core network device receives the first identifier information sent by the relay terminal. The second core network device determines to initiate paging to the remote terminal by using the relay terminal.

In the foregoing design, this helps the second core network device learn of the connection relationship between the relay terminal and the remote terminal.

In a possible design, the method further includes: The second core network device sends the first identifier information to the first core network device, or sends the first identifier information and the second identifier information to the first core network device.

In the foregoing design, this helps the first core network device learn of the connection relationship between the relay terminal and the remote terminal.

In a possible design, that the second core network device sends a second paging message to a second network device includes: The second core network device directly sends the second paging message to the second network device. Alternatively, the second core network device sends the second paging message to a corresponding third network device before a connection of the relay terminal is released, where the third network device is configured to send the second paging message to the second network device.

In the foregoing design, regardless of whether the relay terminal is in the idle state, an active state, or the inactive state, it can be ensured that the relay terminal accurately receives the paging message, so that reliability of paging the remote terminal is improved.

According to a fourth aspect, an embodiment of this application provides a communication method. The method includes: A first core network device sends a third paging message including first identifier information of a remote terminal to a second core network device, where when the remote terminal is in an idle state, the first identifier information includes an S-temporary mobile subscriber identity S-TMSI of the remote terminal, and when the remote terminal is in an inactive state, the first identifier information includes an inactive radio network temporary identifier I-RNTI of the remote terminal, where the second core network device is a core network device corresponding to a relay terminal connected by the remote terminal.

In this embodiment of this application, the described communication method may be implemented by the first core network device, or may be implemented by a component in the first core network device, for example, a component such as a processing chip or a circuit in the first core network device. According to the foregoing method, the first core network device corresponding to the remote terminal may learn of a connection relationship between the remote terminal and the relay terminal, and further the relay terminal initiates paging to the remote terminal, so that it can be ensured that when communicating with the network device by using the relay terminal, the remote terminal can be normally paged by a network side when the remote terminal is in the idle state and the inactive state and is disconnected from the network device. This improves communication reliability.

In a possible design, when the remote terminal is in the inactive state, the method further includes: The first core network device receives a fourth paging message that is sent by a first network device and that includes the first identifier information of the remote terminal.

In the foregoing design, the first network device corresponding to the remote terminal may learn of a connection relationship between the remote terminal and the relay terminal, and further the relay terminal initiates paging to the remote terminal, so that it can be ensured that when communicating with the network device by using the relay terminal, the remote terminal can be normally paged by a network side when the remote terminal is in the inactive state and is disconnected from the network device. This improves communication reliability.

In a possible design, the method further includes: The first core network device receives the first identifier information sent by the second core network device, or receives the first identifier information and second identifier information of the relay terminal that are sent by the second core network device. The first core network device determines to initiate paging to the remote terminal by using the relay terminal.

In the foregoing design, this helps the first core network device learn of the connection relationship between the relay terminal and the remote terminal.

In a possible design, when the remote terminal is in the inactive state, the method further includes: The first core network device sends a second indication message to the first network device, where the second indication message carries the first identifier information, and indicates the first network device to initiate paging to the remote terminal by using the first core network device.

In the foregoing design, this helps the first network device learn of the connection relationship between the relay terminal and the remote terminal.

According to a fifth aspect, an embodiment of this application provides a communication method. The method includes: A second network device receives, from a second core network device, a second paging message including first identifier information of a remote terminal and second identifier information of a relay terminal, where when the remote terminal is in an idle state, the first identifier information includes an S-temporary mobile subscriber identity S-TMSI of the remote terminal, and when the remote terminal is in an inactive state, the first identifier information includes an inactive radio network temporary identifier I-RNTI of the remote terminal; and the second identifier information includes at least one of an S-TMSI or an I-RNTI of the relay terminal. The second network device sends a first paging message including the first identifier information to the relay terminal.

In this embodiment of this application, the described communication method may be implemented by the second network device, or may be implemented by a component in the second network device, for example, a component such as a processing chip or a circuit in the second network device. According to the foregoing method, when receiving the second paging message including the first identifier information: the I-RNTI and/or the I-RNTI of the remote terminal, the second network device may send the first paging message including the first identifier information to the relay terminal, so that the remote terminal can be normally paged by the network side when being in the idle state and the inactive state and is disconnected from the network device. This improves communication reliability.

In a possible design, that the second network device sends a first paging message including the first identifier information to the relay terminal includes:

The second network device sends, on a second PO of a second PF of the relay terminal, the first paging message including the first identifier information, where the second PF and the second PO are determined based on the S-TMSI of the relay terminal.

In the foregoing design, paging to the remote terminal is initiated on the second PO of the second PF of the relay terminal, so that it is ensured that the remote terminal can be normally paged by the network side even when being in the idle state and the inactive state and is disconnected from the network device. This improves communication reliability. In addition, the relay terminal in a power saving state only needs to wake up on the second PO of the second PF to monitor a paging message, including a paging message of the relay terminal and a paging message of the remote terminal, so that power overheads are reduced.

In a possible design, that the second network device sends a first paging message including the first identifier information to the relay terminal includes:

The second network device sends the first paging message including the first identifier information on a first PO of a first PF of the remote terminal, where the second network device receives the first PF and the first PO of the remote terminal that are sent by the relay terminal. Alternatively, the second network device determines a first PO of a first PF based on a serving cell parameter of the relay terminal, the S-TMSI of the remote terminal, and a specific DRX cycle of the remote terminal.

In a possible design, the second network device skips performing data scheduling on the relay terminal on the first PO of the first PF.

In the foregoing design, this helps the second network device corresponding to the relay terminal skip performing data scheduling on the relay terminal on the first PO of the first PF after the second network device corresponding to the relay terminal learns of the first paging message of the remote terminal monitored by the relay terminal on the first PF and the first PO of the remote terminal, and avoids a conflict between monitoring the first paging message of the remote terminal by the relay terminal and performing data scheduling (for example, downlink service scheduling) on the relay terminal by the network device.

In a possible design, the method further includes: The second network device receives BWP switching duration from the relay terminal. The second network device skips performing data scheduling on the relay terminal within the BWP switching duration before the first PO of the first PF.

In the foregoing design, this helps avoid a data loss caused when the second network device performs data scheduling on the relay terminal within the BWP switching duration before the first PO of the first PF.

According to a sixth aspect, an embodiment of this application provides a communication method. The method includes: A relay terminal receives a first paging frame PF and a first paging occasion PO of a remote terminal that are sent by the remote terminal. The relay terminal associates the first PF and the first PO with third identifier information of the remote terminal. When obtaining, through monitoring, a first paging message on the first PO of the first PF, the relay terminal sends the first paging message to the remote terminal corresponding to the third identifier information associated with the first PF and the first PO.

In this embodiment of this application, the relay terminal may monitor the first paging message on the first PO of the first PF of the remote terminal, and when obtaining the first paging message through monitoring, notify that the associated remote terminal is paged, so that the remote terminal can be normally paged by a network side (including a network device side and a core network device side) when the remote terminal is in an idle state and an inactive state and is disconnected from the network device. This improves communication reliability.

In a possible design, the method further includes: The relay terminal sends a serving cell parameter of the relay terminal to the remote terminal.

In the foregoing design, this helps the remote terminal determine the first PF and the first PO.

In a possible design, the method further includes: The relay terminal sends the first PF and the first PO to a second network device corresponding to the relay terminal.

In the foregoing design, this helps the second network device corresponding to the relay terminal skip performing data scheduling on the relay terminal on the first PO of the first PF after the second network device corresponding to the relay terminal learns of the first paging message of the remote terminal monitored by the relay terminal on the first PF and the first PO of the remote terminal, and avoids a conflict between monitoring the first paging message of the remote terminal by the relay terminal and performing data scheduling (for example, downlink service scheduling) on the relay terminal by the network device.

According to a seventh aspect, an embodiment of this application provides a communication method. The method includes: A remote terminal receives a serving cell parameter from a relay terminal. The remote terminal determines a first PF and a first PO based on the serving cell parameter of the relay terminal, an S-temporary mobile subscriber identity S-TMSI of the remote terminal, and a specific discontinuous reception DRX cycle of the remote terminal. The remote terminal sends the first PF and the first PO to the relay terminal.

In the foregoing design, the remote terminal may send the first PF and the first PO of the remote terminal to the relay terminal, so that the relay terminal may monitor the first paging message on the first PO of the first PF of the remote terminal, and when obtaining the first paging message through monitoring, notify that the remote terminal is paged, so that the remote terminal can be normally paged by a network side (including a network device side and a core network device side) when the remote terminal is in an idle state and an inactive state and is disconnected from the network device. This improves communication reliability.

According to an eighth aspect, an embodiment of this application provides a communication apparatus. The apparatus has a function of implementing the method according to the first aspect or the possible designs of the first aspect, or a function of implementing the method according to the sixth aspect or the possible designs of the sixth aspect. The function may be implemented by hardware, or may be implemented by hardware by executing corresponding software. The hardware or the software includes one or more units (modules) corresponding to the function, for example, a transceiver unit and a processing unit.

In a possible design, the apparatus may be a chip or an integrated circuit.

In a possible design, the apparatus includes a processor. The processor is coupled to a memory. The memory is configured to store a program executed by the processor. When the program is executed by the processor, the apparatus may perform the method according to the first aspect or the possible designs of the first aspect, or the method according to the sixth aspect or the possible designs of the sixth aspect.

In a possible design, the apparatus may be a relay terminal.

According to a ninth aspect, an embodiment of this application provides a communication apparatus. The apparatus has a function of implementing the method according to the second aspect or the possible designs of the second aspect, or a function of implementing the method according to the seventh aspect or the possible designs of the seventh aspect. The function may be implemented by hardware, or may be implemented by hardware by executing corresponding software. The hardware or the software includes one or more units (modules) corresponding to the function, for example, a transceiver unit and a processing unit.

In a possible design, the apparatus may be a chip or an integrated circuit.

In a possible design, the apparatus includes a processor. The processor is coupled to a memory. The memory is configured to store a program executed by the processor. When the program is executed by the processor, the apparatus may perform the method according to the second aspect or the possible designs of the second aspect, or the method according to the seventh aspect or the possible designs of the seventh aspect.

In a possible design, the apparatus may be a remote terminal.

According to a tenth aspect, an embodiment of this application provides a communication apparatus. The apparatus has a function of implementing the method according to the third aspect or the possible designs of the third aspect. The function may be implemented by hardware, or may be implemented by hardware by executing corresponding software. The hardware or the software includes one or more units (modules) corresponding to the function, for example, a transceiver unit and a processing unit.

In a possible design, the apparatus may be a chip or an integrated circuit.

In a possible design, the apparatus includes a processor. The processor is coupled to a memory. The memory is configured to store a program executed by the processor. When the program is executed by the processor, the apparatus may perform the method according to the third aspect or the possible designs of the third aspect.

In a possible design, the apparatus may be a second core network device.

According to an eleventh aspect, an embodiment of this application provides a communication apparatus. The apparatus has a function of implementing the method according to the fourth aspect or the possible designs of the fourth aspect. The function may be implemented by hardware, or may be implemented by hardware by executing corresponding software. The hardware or the software includes one or more units (modules) corresponding to the function, for example, a transceiver unit and a processing unit.

In a possible design, the apparatus may be a chip or an integrated circuit.

In a possible design, the apparatus includes a processor. The processor is coupled to a memory. The memory is configured to store a program executed by the processor. When the program is executed by the processor, the apparatus may perform the method according to the fourth aspect or the possible designs of the fourth aspect.

In a possible design, the apparatus may be a first core network device.

According to a twelfth aspect, an embodiment of this application provides a communication apparatus. The apparatus has a function of implementing the method according to the fifth aspect or the possible designs of the fifth aspect. The function may be implemented by hardware, or may be implemented by hardware by executing corresponding software. The hardware or the software includes one or more units (modules) corresponding to the function, for example, a transceiver unit and a processing unit.

In a possible design, the apparatus may be a chip or an integrated circuit.

In a possible design, the apparatus includes a processor. The processor is coupled to a memory. The memory is configured to store a program executed by the processor. When the program is executed by the processor, the apparatus may perform the method according to the fifth aspect or the possible designs of the fifth aspect.

In a possible design, the apparatus may be a second network device.

According to a thirteenth aspect, this application provides a computer-readable storage medium. The storage medium stores computer instructions. When the computer instructions are executed, the method according to the first aspect or the possible designs of the first aspect, the method according to the second aspect or the possible designs of the second aspect, the method according to the third aspect or the possible designs of the third aspect, the method according to the fourth aspect or the possible designs of the fourth aspect, the method according to the fifth aspect or the possible designs of the fifth aspect, or the method according to the sixth aspect or the possible designs of the sixth aspect may be implemented.

According to a fourteenth aspect, this application further provides a computer program product, including a computer program or instructions. When the computer program or the instructions are executed, the method according to the first aspect or the possible designs of the first aspect, the method according to the second aspect or the possible designs of the second aspect, the method according to the third aspect or the possible designs of the third aspect, the method according to the fourth aspect or the possible designs of the fourth aspect, or the method according to the fifth aspect or the possible designs of the fifth aspect may be implemented.

According to a fifteenth aspect, this application further provides a chip. The chip is configured to implement the method according to the first aspect or the possible designs of the first aspect, the method according to the second aspect or the possible designs of the second aspect, the method according to the third aspect or the possible designs of the third aspect, the method according to the fourth aspect or the possible designs of the fourth aspect, or the method according to the fifth aspect or the possible designs of the fifth aspect.

For technical effects that can be achieved in the eighth aspect to the fifteenth aspect, refer to the technical effects that can be achieved in the first aspect to the seventh aspect. Details are not described herein again.

DETAILED DESCRIPTION OF ILLUSTRATIVE EMBODIMENTS

Figures 1, 2:
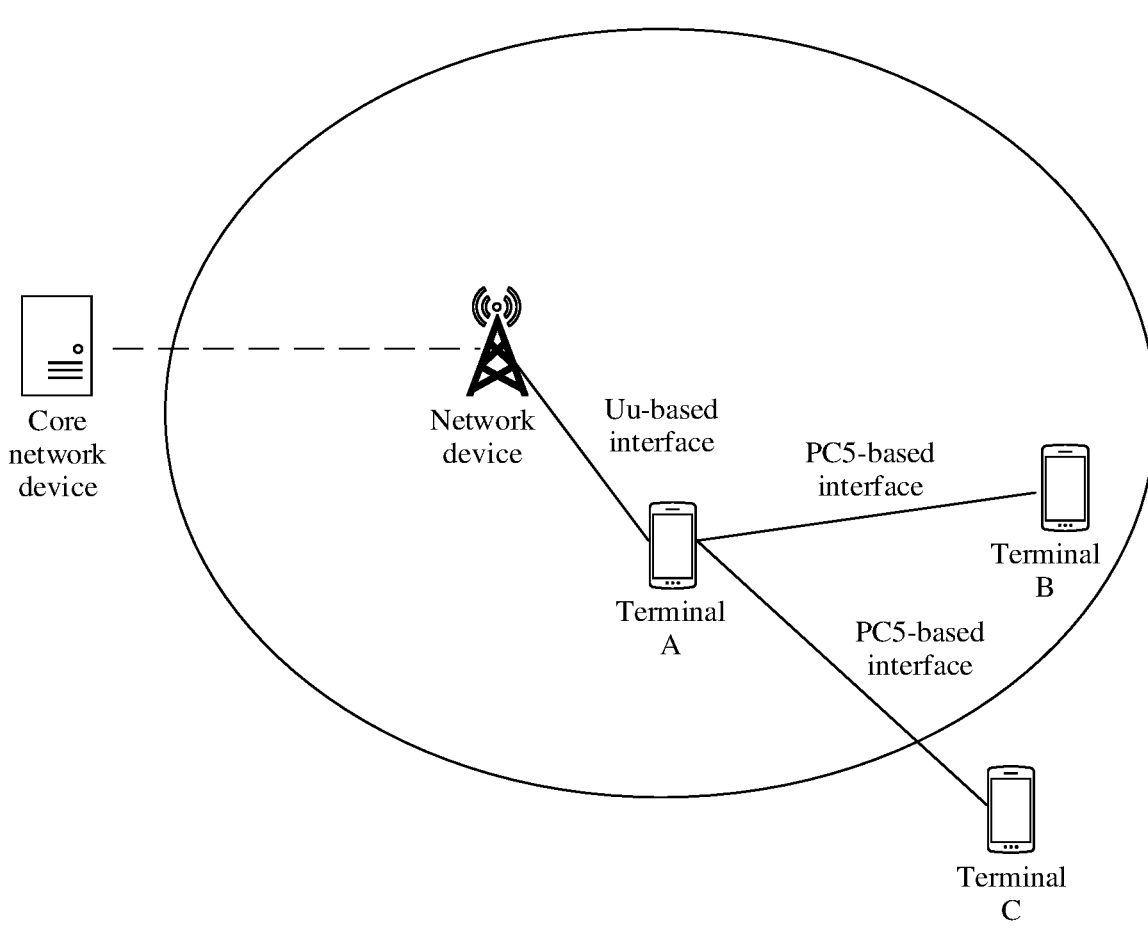
FIG. 1 is a schematic diagram of a communication architecture according to an embodiment of this application.
FIG. 2 is a schematic diagram of a switching relationship between RRC connection states according to an embodiment of this application.

The technical solutions in embodiments of this application may be applied to various communication systems, for example, communication systems such as a long term evolution (LTE) system, a long term evolution-advanced (LTE-A) system, and a 5th generation (5G) system, or may be applied to wireless fidelity (Wi-Fi), world interoperability for microwave access (WiMAX), a future communication system, or another similar communication system, for example, a future 6th generation (6G) system. The 5G system may also be referred to as a new radio (NR) system. Specifically, an architecture of the communication system to which embodiments of this application are applied may be shown in FIG. 1, includes a network device and at least one terminal (for example, a terminal A, a terminal B, and a terminal C in FIG. 1), and may further include a core network device. There may be one or more network devices, terminals, and core network devices in the communication system. This is not limited in embodiments of this application.

In the foregoing architecture of the communication system, the terminal A is within a service range of the network device, and has a relay function for supporting providing a relay service for a nearby terminal. The terminal B has poor communication quality with the network device. The terminal C is out of the service range of the network device. The terminal B or the terminal C may select the relay function of the terminal A to implement connection to (communication with) the network device. In embodiments of this application, a terminal that provides the relay service and is within the service range of the network device, for example the terminal A, may be referred to as a relay terminal (relay UE), and terminals that receive the relay service, for example, the terminal B and the terminal C, may be referred to as remote terminals (remote UEs).

In addition, the architecture of the communication system includes two communication interfaces: a PC5 interface and a Uu interface. The PC5 interface is a direct communication interface between the terminals, and a PC5 interface-based direct communication link between the terminals may be referred to as a sidelink, and is used for communication between the terminals. The Uu interface is a communication interface between the terminal and the network device, and Uu interface-based communication links between the terminal and the network device include an uplink (UL) and a downlink (DL), and are used for communication between the terminal and the network device.

For ease of understanding by a person skilled in the art, the following describes some terms in embodiments of this application.

(1) Terminal: The terminal may also be referred to as a terminal device, a user equipment (UE), a mobile station (MS), a mobile terminal (MT), or the like, and is a device that provides voice and/or data connectivity for a user. The terminal device may communicate with a core network through a radio access network (RAN), and exchange a voice and/or data with the RAN. For example, the terminal device may be a hand-held device or a vehicle-mounted device that has a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

(2) Network device: The network device is a device that is in a network and that is configured to connect a terminal device to a wireless network. The network device may be a node in a radio access network, and may also be referred to as a base station, or may be referred to as a radio access network (RAN) node (or device). The network device may be configured to mutually convert a received over-the-air frame and an internet protocol (IP) packet and serve as a router between the terminal device and a rest portion of the access network, where the rest portion of the access network may include an IP network. The network device may further coordinate attribute management of an air interface. For example, the network device may include a long term evolution (LTE) system or an evolved NodeB (NodeB, eNB, or e-NodeB, evolved NodeB) in a long term evolution-advanced (LTE-A) system; or may include a next generation NodeB (gNB) in a 5th generation (5G) new radio (NR) system; or may further include a transmission reception point (TRP), a home base station (for example, a home evolved NodeB, or a home NodeB, HNB), a baseband unit (BBU), a Wi-Fi access point (AP), or the like; or may further include a central unit (CU) and a distributed unit (DU) in a cloud access network (C-RAN) system. This is not limited in embodiments of this application.

(3) RRC connected state: A terminal may have three RRC connected states: a radio resource control (RRC) connected state (RRC_CONNECTED), an RRC idle state (RRC_IDLE), and an RRC inactive state (RRC_INACTIVE). As shown in FIG. 2, the RRC connected state can be mutually transitioned with each of the RRC idle state and the RRC inactive state. However, for the RRC idle state and the RRC inactive state, only the RRC inactive state can be transitioned to the RRC idle state. In addition, it should be understood that, in embodiments of this application, the RRC connected state may be briefly referred to as a "connected state", the RRC idle state may be briefly referred to as an "idle state", and the RRC inactive state may be briefly referred to as an "inactive state".

Figures 3, 4:
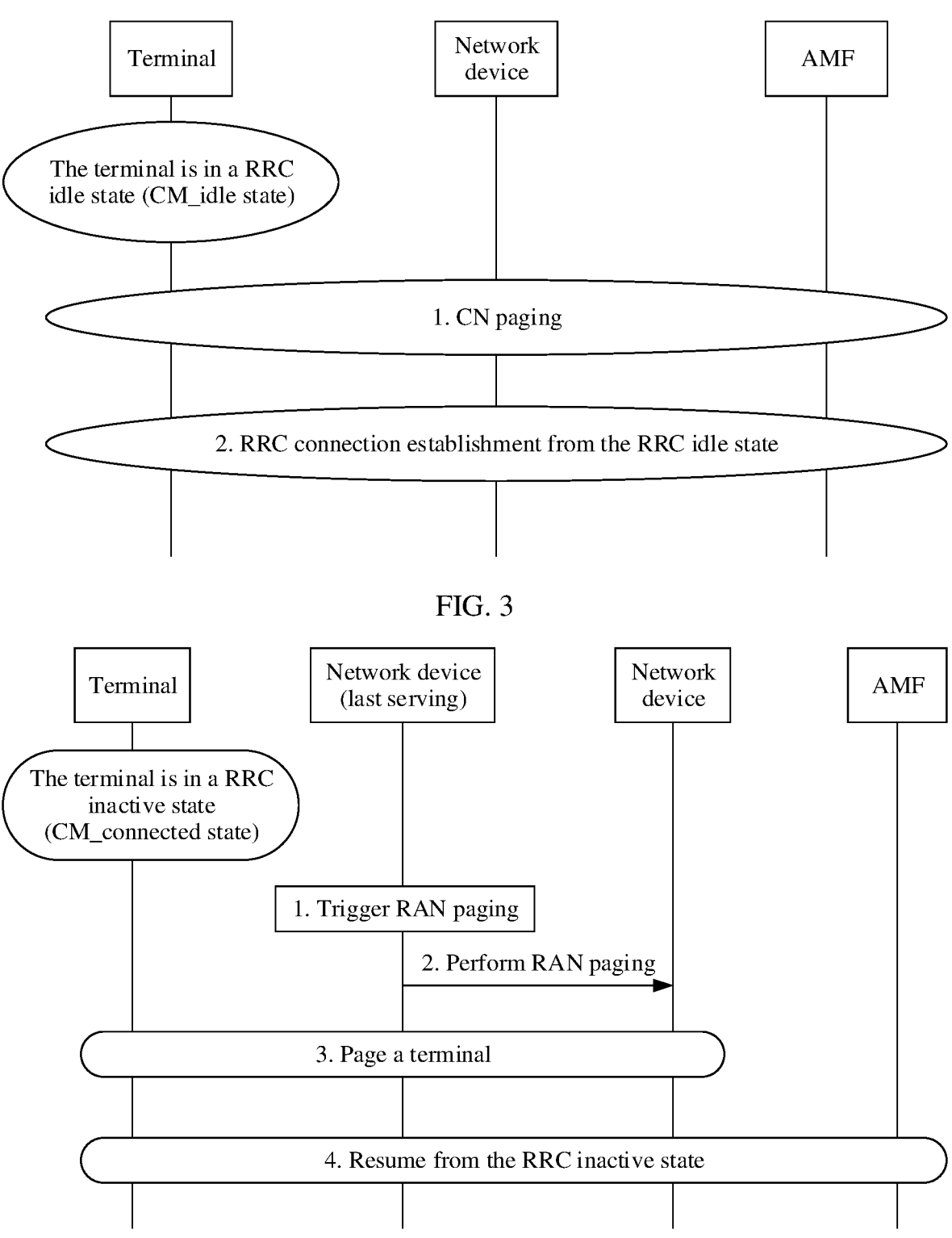
FIG. 3 is a schematic diagram of a paging process initiated by a core network according to an embodiment of this application.
FIG. 4 is a schematic diagram of a paging process initiated by a network device according to an embodiment of this application.

(4) Paging (Paging): Paging may be classified into paging initiated by a core network (CN) and paging initiated by a network device side. The paging initiated by the CN may be referred to as CN Paging, and is initiated for a terminal in an idle state based on a tracking area (TA) of the terminal. Refer to FIG. 3. The paging initiated by the CN is initiated by an access and mobility management function (AMF) network element in the core network, a paging message is sent to all network devices in a tracking area list (TAI list) of the terminal, and these network devices then transparently transmit the paging message to all terminals in related cells of these network devices. The terminal that obtains the paging message through monitoring checks whether the paging message includes an ID of the terminal. If the paging message includes the ID of the terminal, the terminal initiates an RRC establishment request to connect to the network device. If the paging message does not include the ID of the terminal, the terminal ignores the paging request.

The paging initiated by the network device side may be referred to as radio access network (RAN) paging, and is initiated for a terminal in an inactive state based on a RAN-based notification area of the terminal. Refer to FIG. 4. The paging initiated by the network device side is initiated by a last serving network device before a terminal enters the inactive state from an active state. Because that the terminal enters the inactive state is not sensed by the AMF network element and a UPF network element, and the AMF network element or the UPF network element considers that the terminal is still in the active state, the AMF network element sends a paging instruction or the UPF network element sends downlink data to the last serving network device. After failing to find the terminal, the last serving network device sends a paging message to all network devices in a RAN-based notification area list (RANAC list) in which the terminal is located, and these network devices then transparently transmit the paging message to all terminals in related cells of these network devices. The terminal that obtains the paging message through monitoring checks whether the paging message includes an ID of the terminal. If the paging message includes the ID of the terminal, the terminal initiates an RRC resume request to connect to the network device. If the paging message does not include the ID of the terminal, the terminal ignores the paging request.

In addition, in a CU-DU architecture, a mechanism in an existing protocol is usually as follows: The CU determines cells that are included in the TAI list or a RAN paging area in the paging message and that belong to DUs, and then sends a cell list related to the paging message to related DUs, so that the DU forms a paging message and sends the paging message to all terminals in the cells in the cell list.

(5) Paging frame (PF) and a paging occasion (PO). A terminal in an idle state or an inactive state "wakes up" only in a specific time period to receive a paging message. A frequency domain resource occupied by the paging message in frequency domain is usually specified by a physical downlink control channel (PDCCH) scrambled by using a P-RNTI that is in a radio network temporary identifier (RNTI) and that is used to identify transmission of the paging message. In time domain, the terminal attempts to receive the paging message on the PO of the PF in a paging cycle. The terminal maintains a "sleep state" in another time period. This can reduce power consumption and prolong usage time of a battery of the terminal. The network device needs to send the paging message through an air interface at this moment. In this way, the terminal may receive the paging message at this moment.

The PF is a system frame that satisfies the following formula:

$$(SFN+PF\_\text{offset})\bmod T=(T \text{ div } N)^*(UE\_ID \bmod N)$$

The PO is indicated by using an index i_s:

$$i\_s=\text{floor}(UE\_ID/N)\bmod Ns$$

div represents rounding, mod represents modulo, and floor represents rounding down. Meanings of the foregoing parameters are shown in the following Table 1: T represents a discontinuous reception (DRX) cycle of a serving cell, N represents a quantity of PFs included in each DRX cycle of the serving cell, Ns represents a quantity of POs included in each PF of the serving cell, PF_offset represents a PF offset corresponding to the serving cell, and UE_ID represents a value of a S-temporary mobile subscriber identifier (S-TMSI) mod 1024 of the terminal.

TABLE 1

| Parameter | Description |
|---|---|
| T | DRX cycle, min(specific DRX, default DRX) |
| N | Quantity of PFs included in each cycle T |
| Ns | Quantity of POs included in each PF |
| PF_offset | offset used for PF |
| UE_ID | S-TMSI mod 1024 |

In addition, it should be understood that terms "system" and "network" in embodiments of this application may be used interchangeably. "A plurality of" means two or more. In view of this, "a plurality of" may also be understood as "at least two" in embodiments of this application. "At least one" may be understood as one or more, for example, one, two, or more. For example, including at least one means including one, two, or more, and does not limit which items are included. For example, if at least one of A, B, and C is included, A, B, C, A and B, A and C, B and C, or A, B, and C may be included. Similarly, understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects.

Unless otherwise stated, ordinal numbers such as "first" and "second" in embodiments of this application are used to distinguish between a plurality of objects, but are not intended to limit a sequence, a time sequence, priorities, or importance of the plurality of objects. In addition, descriptions of "first" and "second" do not necessarily indicate that objects are different.

This application aims to ensure that the network side (including the network device side and the core network device side) can normally initiate paging to the remote terminal when the remote terminal is in the idle state or the inactive state, the relay terminal monitors a first paging message including first identifier information of the remote terminal, and when obtaining, through monitoring, the first paging message including the first identifier information of the remote terminal, indicates that the remote terminal is paged. Specifically, that the relay terminal monitors the first paging message including the first identifier information of the remote terminal may include scenarios such as monitoring on a first PO of a first PF of the remote terminal and monitoring on a PO of a second PF of the relay terminal. The following describes in detail this embodiment of this application with reference to different scenarios.

Scenario 1: The relay terminal monitors, on the first PO of the first PF of the remote terminal, the first paging message used for paging the remote terminal.

Figure 5:
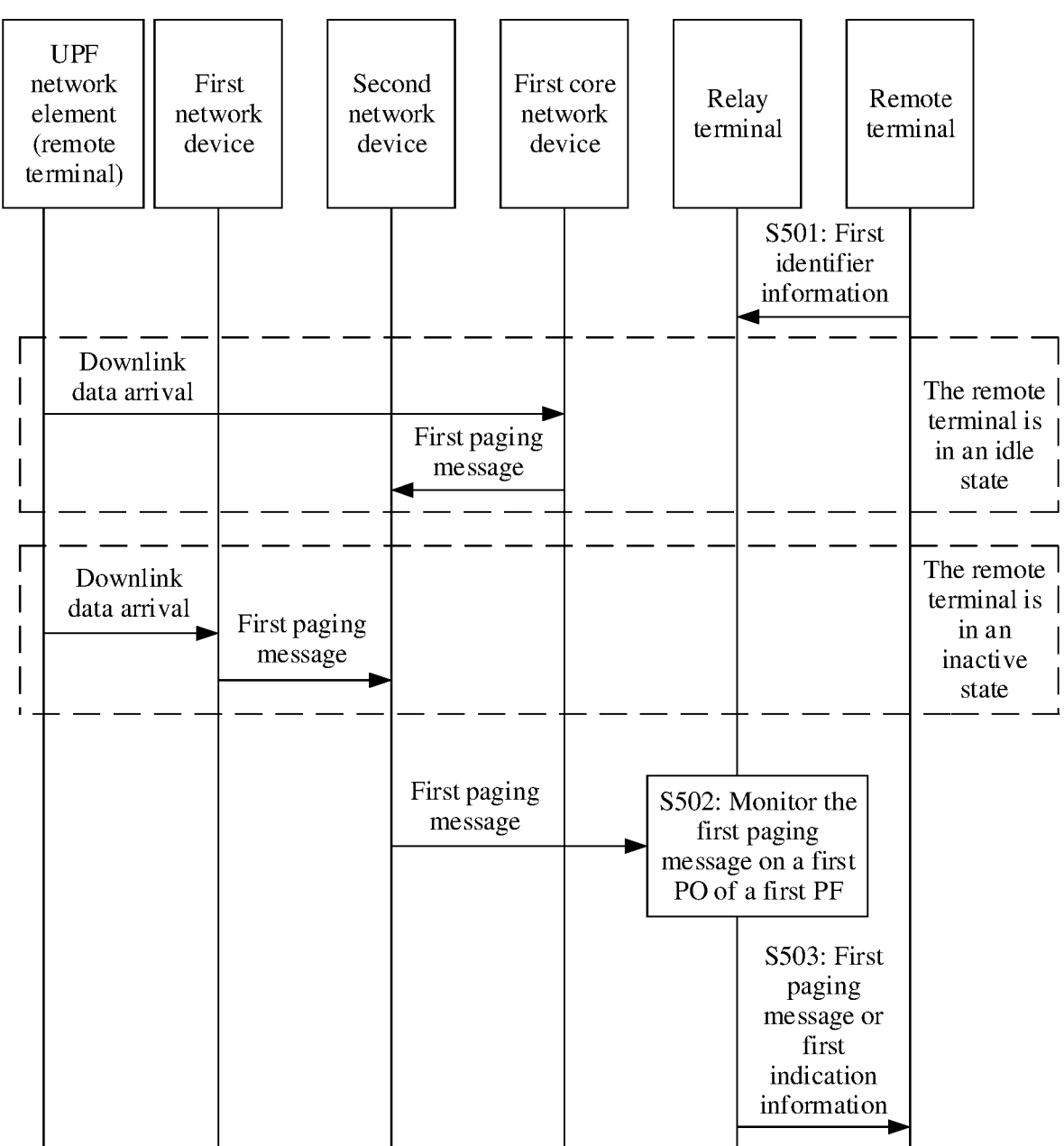
FIG. 5 is a schematic diagram 1 of a communication process according to an embodiment of this application.

FIG. 5 is a schematic diagram of a communication process according to an embodiment of this application. The process includes the following steps:

S501: A remote terminal sends first identifier information of the remote terminal to a relay terminal, and the relay terminal receives the first identifier information.

When the remote terminal is in an idle state, the first identifier information includes an S-TMSI of the remote terminal, and when the remote terminal is in an inactive state, the first identifier information includes an inactive radio network temporary identifier (I-RNTI) of the remote terminal.

After establishing a unicast connection to the relay terminal, the remote terminal may be in different states (RRC connected states), and face different paging cases. Specifically, after establishing the unicast connection to the relay terminal, if being in the idle state, the remote terminal sends the first identifier information including the S-TMSI of the remote terminal to the relay terminal, so that the relay terminal monitors and identifies paging initiated by a core network to the remote terminal. After establishing the unicast connection to the relay terminal, if being in the inactive state, or entering the inactive state after receiving an RRC release message, the remote terminal sends the first identifier information including the I-RNTI of the remote terminal to the relay terminal, so that the relay terminal monitors and identifies paging initiated by a last serving network device of the remote terminal (namely, a network device corresponding to the remote terminal before the connection is released) to the remote terminal. In a possible implementation, the relay terminal needs to calculate the first PF and the first PO of the remote terminal by using the S-TMSI of the remote terminal and a specific DRX cycle of the remote terminal. Therefore, to facilitate learning of the S-TMSI of the remote terminal, after the remote terminal establishes the unicast connection to the relay terminal, if the remote terminal is in the inactive state, the first identifier information sent by the remote terminal to the relay terminal may further include the S-TMSI of the remote terminal.

For obtaining of the first PF and the first PO of the remote terminal, the relay terminal may perform determining based on a serving cell parameter of the relay terminal, the S-TMSI of the remote terminal, and the specific DRX cycle of the remote terminal. Alternatively, after performing determining based on a serving cell parameter of the relay terminal, the S-TMSI of the remote terminal, and the specific DRX cycle of the remote terminal, the remote terminal may send the first PF and the first PO to the relay terminal. Alternatively, after obtaining the S-TMSI of the remote terminal and/or the specific DRX cycle of the remote terminal, the relay terminal sends the S-TMSI of the remote terminal and/or the specific DRX cycle of the remote terminal to a second network device corresponding to the relay terminal, and the second network device performs determining. Specifically, the first PF and the first PO may be obtained in the following manner. In addition, it should be understood that in this application, the DRX cycle and DRX may be used interchangeably. For example, the specific DRX cycle may be briefly referred to as specific DRX.

Manner 1: The relay terminal performs determining based on the serving cell parameter of the relay terminal, the S-TMSI of the remote terminal, and the specific DRX of the remote terminal.

Figure 6:
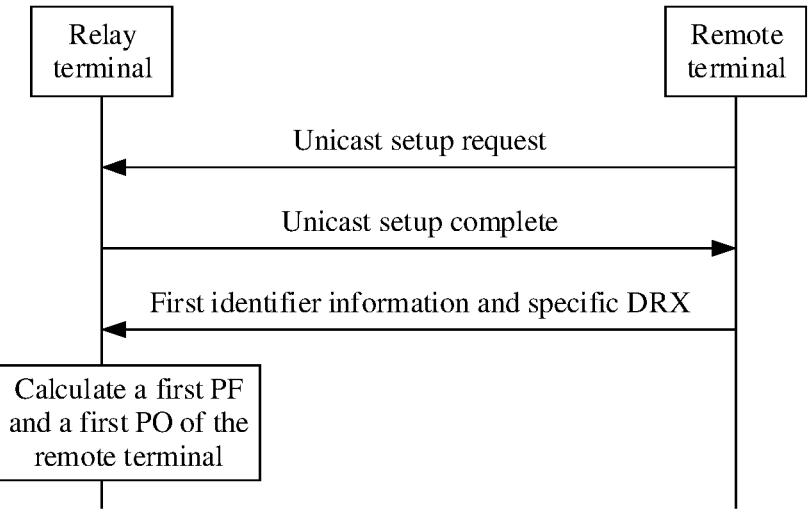
FIG. 6 is a schematic diagram 1 of a process of determining a first PF and a first PO according to an embodiment of this application.

As shown in FIG. 6, after a unicast connection is established between the remote terminal and the relay terminal by exchanging unicast setup request information and unicast setup complete information, the remote terminal may send first identifier information and specific DRX of the remote terminal to the relay terminal, and the relay terminal obtains a first PF and a first PO of the remote terminal through calculation based on a parameter of a serving cell (the serving cell of the relay terminal) (for example, a parameter such as default (default) DRX, N, Ns, or PF_offset corresponding to the serving cell), an S-TMSI of the remote terminal, and the specific DRX of the remote terminal. For a specific calculation process, refer to a description part of the PF and the PO in this application. Details are not described again.

Manner 2: After performing determining based on the serving cell parameter of the relay terminal and the S-TMSI of the remote terminal, the remote terminal sends the first PF and the first PO to the relay terminal.

Figure 7:
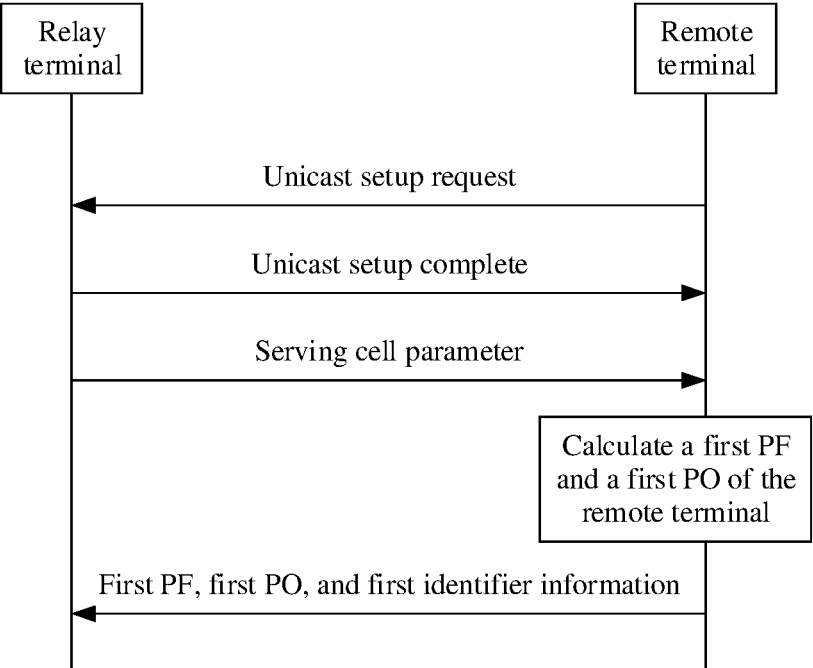
FIG. 7 is a schematic diagram 2 of a process of determining a first PF and a first PO according to an embodiment of this application.

As shown in FIG. 7, after a unicast connection is established between the remote terminal and the relay terminal by exchanging unicast setup request x information and unicast setup complete information, the relay terminal sends a serving cell parameter of the relay terminal to the remote terminal, and the remote terminal obtains a first PF and a first PO of the remote terminal through calculation based on the serving cell parameter of the relay terminal (for example, a parameter such as default DRX, N, Ns, and PF_offset corresponding to the serving cell), an S-TMSI of the remote terminal, and specific DRX of the remote terminal, and sends the first PF and the first PO that are obtained through calculation and first identifier information of the remote terminal to the relay terminal.

It should be understood that before sending the first identifier information to the relay terminal, in other words, before determining to connect to the network device by using the relay terminal, the remote terminal may first determine whether the remote terminal is within a serving cell range of the network device, and select a manner of connecting to the network device by using the relay terminal only when the remote terminal is out-of-coverage (OOC) of the network device. Otherwise, the remote terminal may directly monitor, on a Uu interface, a paging message sent by the network device, and further receive a first paging message including the first identifier information of the remote terminal.

Manner 3: After performing determining based on the S-TMSI of the remote terminal and the specific DRX of the remote terminal and the serving cell parameter, the second network device corresponding to the relay terminal sends the first PF and the first PO to the relay terminal.

Figure 8:
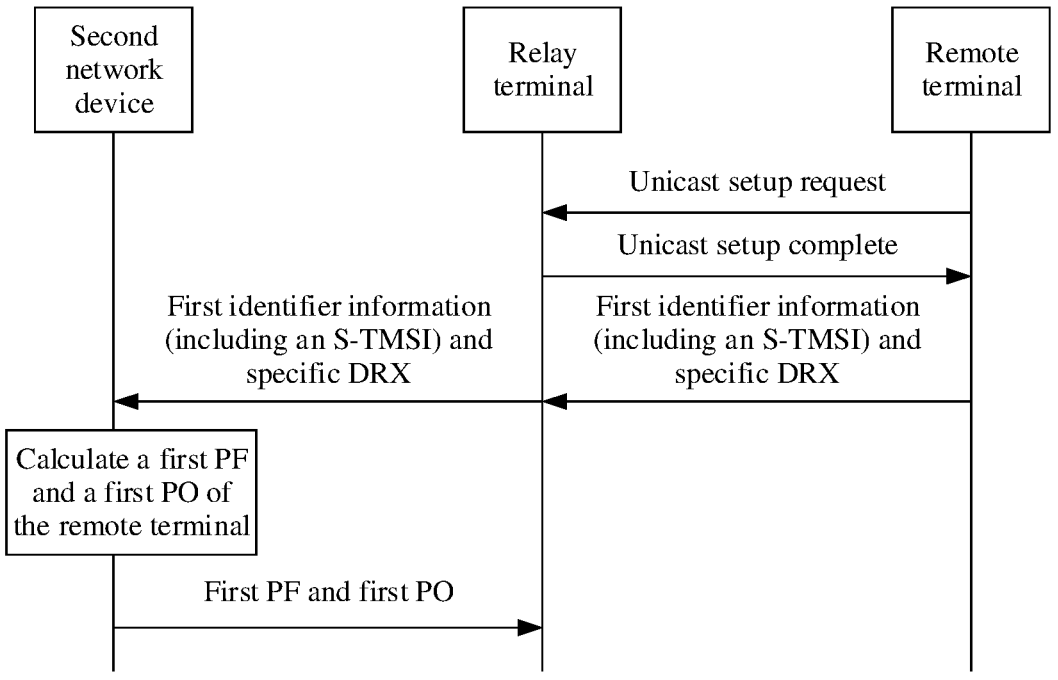
FIG. 8 is a schematic diagram 3 of a process of determining a first PF and a first PO according to an embodiment of this application.

As shown in FIG. 8, after a unicast connection is established between the remote terminal and the relay terminal by exchanging unicast setup request information and unicast setup complete information, the relay terminal obtains an S-TMSI and specific DRX of the remote terminal, and reports the S-TMSI and the specific DRX to the second network device corresponding to the relay terminal. The second network device obtains a first PF and a first PO of the remote terminal through calculation based on a parameter of the serving cell (the serving cell of the relay terminal) (for example, a parameter such as default DRX, N, Ns, or PF_offset corresponding to a serving cell), the S-TMSI of the remote terminal, and the specific DRX, and sends the first PF and the first PO that are obtained through calculation to the relay terminal.

S502: The relay terminal monitors a first paging message including the first identifier information on a first PO of a first PF of the remote terminal.

Similar to the remote terminal, the relay terminal may alternatively be in an active state, the idle state, or the inactive state. When the relay terminal is in the inactive state or the idle state, the second network device (the network device corresponding to the relay terminal) skips performing data scheduling (for example, downlink service data scheduling) on the relay terminal on the first PO of the first PF, and the relay terminal can successfully monitor the first paging message on the first PO of the first PF. However, when the relay terminal is in the active state, the second network device may perform data scheduling on the relay terminal on the first PO of the first PF, and a slot conflict between monitoring the first paging message by the relay terminal on the first PO of the first PF and performing data scheduling on the relay terminal may exist. If a capability of the relay terminal cannot support both performing data scheduling by the second network device and monitoring the first paging message on the first PO of the first PF, a scheduling conflict problem of the relay terminal needs to be resolved.

In a possible implementation, the relay terminal may send the first PF and the first PO of the remote terminal to the second network device. After learning that the relay terminal monitors the first paging message of the remote terminal on the first PF and the first PO of the remote terminal, the second network device limits a scheduling slot of the relay terminal, and skips performing data scheduling on the relay terminal on the first PO of the first PF.

In another possible implementation, the relay terminal limits a slot in which the relay terminal monitors the first paging message of the remote terminal, and monitors the first paging message on the first PO of the first PF only when no data scheduling is performed on the relay terminal on the first PO of the first PF. That is, the relay terminal may preferentially ensure data scheduling of the relay terminal.

In addition, in the active state, a BWP configured for the relay terminal is an active BWP, and the paging message is usually delivered on an initial BWP. Therefore, before monitoring the first paging message of the remote terminal on the first PF and the first PO of the remote terminal, the relay terminal needs to complete switching from the active BWP to the initial BWP.

During implementation, the switching from the active BWP to the initial BWP by the relay terminal may need specific switching duration (namely, BWP switching duration). If the relay terminal starts the BWP switching at a start moment of the calculated first PO of the first PF, and the first paging message just arrives during switching, the relay terminal may fail to receive the delivered first paging message within the calculated first PO of the first PF. The foregoing problem caused by a BWP switching delay may be specifically resolved in the following manner:

Manner 1: The relay terminal performs BWP switching in advance, so that it is ensured that the relay terminal works in the initial BWP during the first PO of the first PF.

Specifically, the second network device of the relay terminal delivers the first paging message within the calculated first PO of the first PF. Assuming that the BWP switching duration needed by the relay terminal to perform BWP switching is t, each time the first PO of the first PF starts, the relay terminal switches from the active BWP to the initial BWP at advance time t. Therefore, it is ensured that when the first PO of the first PF starts, a working BWP of the relay terminal has been switched to the initial BWP. The relay terminal maintains duration of the first PO of the first PF on the initial BWP, and then switches back to the active BWP.

In addition, the relay terminal cannot receive, when performing BWP switching, data delivered by the second network device. Therefore, in some implementations, when the relay terminal is in the radio resource control RRC connected state and the active BWP does not cover the initial BWP, before monitoring the first paging message on the first PO of the first PF of the remote terminal, the relay terminal sends the BWP switching duration of the relay terminal to the second network device corresponding to the relay terminal, and the second network device skips performing data scheduling on the relay terminal within the BWP switching duration before the first PO of the first PF.

Manner 2: The relay terminal performs BWP switching at a start moment of the first PO of the first PF, and switches back to the active BWP after maintaining duration of the first PO of the first PF on the initial BWP. In addition, the second network device corresponding to the relay terminal delays a delivery moment of the first paging message based on the BWP switching duration of the relay terminal.

Specifically, the relay terminal performs switching from the active BWP to the initial BWP at the start moment of the first PO of the first PF each time, and switches back to the active BWP after maintaining the duration of the first PO of the first PF on the initial BWP. In addition, the second network device corresponding to the relay terminal obtains the BWP switching duration of the relay terminal, which is assumed to be t. Then, the second network device of the relay terminal delays the first PO of the first PF by the t duration, and delivers the first paging message within the delayed first PO of the first PF.

Optionally, there may be another negotiation manner between the second network device corresponding to the relay terminal and the relay terminal. To be specific, a moment at which the second network device delivers the paging message and a moment at which the relay terminal performs BWP switching are negotiated, provided that it is ensured that the relay terminal in the active state has switched to the initial BWP when the second network device delivers the paging message.

In the foregoing manner, the relay terminal can correctly receive, on the initial BWP, the first paging message delivered by the second network device.

S503: When the relay terminal obtains, through monitoring, a first paging message including the first identifier information, the relay terminal sends the first paging message to the remote terminal or sends first indication information to the remote terminal, where the first indication information indicates that the remote terminal is paged.

When the remote terminal is in the idle state, the first core network device (the core network device corresponding to the remote terminal, for example, an AMF network element corresponding to the remote terminal) initiates the paging to the remote terminal. After identifying an arrival indication of downlink data of the UPF network element, the first core network device initiates paging to remote terminal, in other words, sends, to all network devices in a tracking area of the remote terminal, a first paging message including first identifier information (for example, an S-TMSI) of the remote terminal. After receiving the first paging message, the second network device (the network device corresponding to the relay terminal) transparently transmits the first paging message to all terminals in a related cell of the second network device.

When the remote terminal is in the inactive state, a first network device (the network device corresponding to the remote terminal, for example, a network device that last serves the remote terminal before the remote terminal enters the inactive state from the active state, which may also be referred to as an anchor network device of the remote terminal) initiates paging to the remote terminal. Because that the remote terminal enters the inactive state is not sensed by a core network side corresponding to the relay terminal, and the core network side considers that the remote terminal is still in the active state, the core network side continues to send data to the first network device. When the downlink data arrives (DL data arrives) at the first network device, after failing to find the remote terminal, the first network device sends the first paging message including the first identifier information (for example, the I-RNTI) of the remote terminal to all network devices in the RAN-based notification area in which the remote terminal is located, and the second network device transparently transmits the first paging message to all terminals in a related cell of the second network device after receiving the first paging message.

After obtaining the paging message on the first PO of the first PF through monitoring, the relay terminal parses the paging message. If the paging message includes the first identifier information of the remote terminal, the relay terminal determines that the first paging message used for paging the remote terminal is obtained through monitoring. For example, when the first paging message is initiated by the core network corresponding to the remote terminal (CN Paging), the relay terminal may parse and identify the first identifier information (S-TMSI) of the remote terminal. When the first paging message is initiated by the first network device (RAN Paging), the relay terminal may parse and identify the first identifier information (I-RNTI) of the remote terminal.

After obtaining the first paging message through monitoring, the relay terminal may send the first paging message to the remote terminal in a form of broadcast, multicast, unicast, or the like. For example, the relay terminal may send the first paging message on a PC5 interface, for example, directly send the first paging message by using a PC5-RRC message or a PC5-S message, or may include the first paging message on a PC5-RRC message or a PC5-S message for sending.

It should be understood that the first paging message sent by the relay terminal to the remote terminal may have same content as the first paging message obtained by the relay terminal through monitoring. In other words, the relay terminal transparently transmits the first paging message to the remote terminal without modifying the content of the first paging message. Certainly, the first paging message sent by the relay terminal to the remote terminal may have different content from the first paging message obtained by the relay terminal through monitoring. For example, the relay terminal may delete, from the first paging message obtained through monitoring, identifier information that is of another terminal and that is not related to the remote terminal (for example, delete content in a paging record list and reserve only the first identifier information of the remote terminal), and then send the first paging message to the remote terminal. This is not limited in this application.

After obtaining the first paging message through monitoring, the relay terminal may alternatively indicate, in a manner of sending an indication message to the remote terminal, that the remote terminal is paged. For example, the relay terminal may send, to the remote terminal, first indication information indicating that the remote terminal is paged, to indicate that the remote terminal is paged. The first indication information may be sent by using PC5 MAC CE information, a PC5-RRC message, or a PC5-S message that is based on a PC5 interface.

Certainly, after obtaining the paging message on the first PO of the first PF through monitoring, the relay terminal may alternatively not parse the paging message, but send the paging message to all connected remote terminals in a broadcast manner. Optionally, paging occasions of these remote terminals may be limited to the first PF and the first PO.

After receiving the first paging message or the first indication information, the remote terminal determines that the remote terminal is paged, and may connect to the network device, to normally receive the data sent by the network device.

In addition, to ensure the data scheduled between the remote terminal and the network side (the network device side and/or the core network device side), after obtaining the first paging message through monitoring, if being in the idle state or the inactive state, the relay terminal may enter the active state.

In a possible implementation, the relay terminal may determine, in one or more of the following manners, whether to continue to monitor the first paging message used for paging the remote terminal.

Manner 1: Perform determining by determining whether the unicast connection to the remote terminal exists.

Method 2: Stop, through a paging failure, monitoring the first paging message used for paging the remote terminal.

Manner 3: Stop monitoring the first paging message used for paging the remote terminal after the remote terminal establishes a connection to another relay terminal, and the network side senses and indicates that the relay terminal releases the connection.

For example, after the unicast connection between the relay terminal and the remote terminal is disconnected, the relay terminal stops monitoring the first paging message used for paging the remote terminal. After the relay terminal sends the first paging message or the first indication information to the remote terminal, if the remote terminal does not initiate a connection to the network device within specified duration, paging fails, and the relay terminal stops monitoring the first paging message used for paging the remote terminal. The network side (the core network device or the network device) sends a message for releasing the connection to the remote terminal to the relay terminal, and the relay terminal stops monitoring the first paging message used for paging the remote terminal.

Optionally, to ensure that the relay terminal obtains the first paging message through monitoring within a paging range of the paging sent by the core network of the remote terminal or a paging range of the paging initiated by the network device, the remote terminal may perform tracking area update (TAU) and RAN-based notification area update (RNAU) of the remote terminal after establishing the unicast connection to the relay terminal, so that both TA network device coverage and RNA network device coverage of the remote terminal can cover the network device in which the relay terminal is located. That is, after the unicast connection is established, the relay terminal notifies the remote terminal of an identifier of a cell in which the relay terminal is located. When the cell is not in the TA coverage or the RNA coverage of the remote terminal, the remote terminal establishes an RRC connection, and reports the identifier of the cell in which the relay terminal is located, to perform TAU and RNAU of the remote terminal.

In some implementations, the relay terminal may further maintain an association relationship between the first PF and the first PO of the remote terminal and third identifier information of the remote terminal. When obtaining the first paging message through monitoring on the first PO of the first PF, the relay terminal sends the first paging message obtained through monitoring to all remote terminals associated with the first PF and the first PO.

Figure 9:
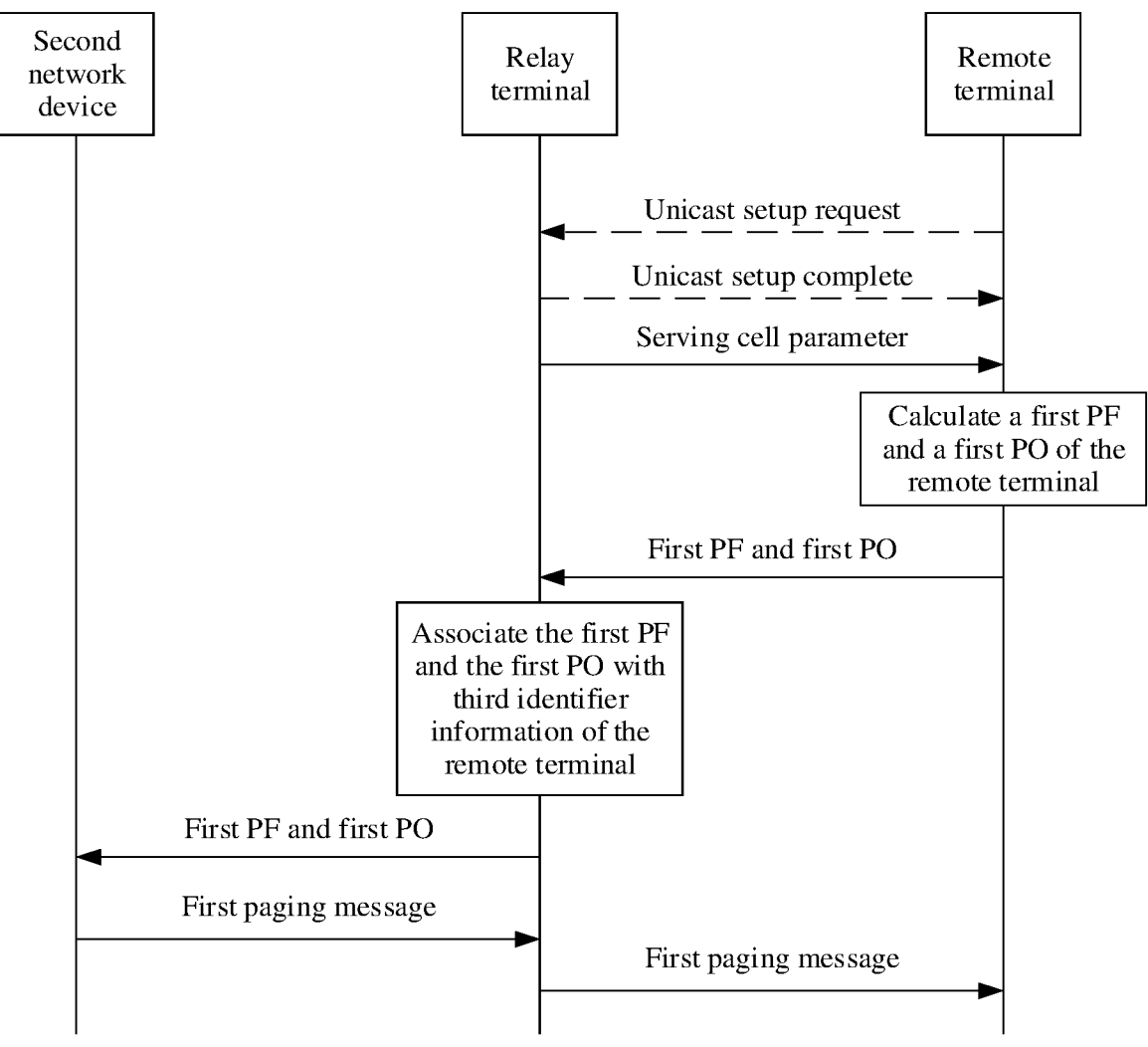
FIG. 9 is a schematic diagram 2 of a communication process according to an embodiment of this application.

As shown in FIG. 9, after a unicast connection is established between the remote terminal and the relay terminal by exchanging unicast setup request information and unicast setup complete information, the relay terminal sends a serving cell parameter of the relay terminal to the remote terminal, and the remote terminal obtains a first PF and a first PO of the remote terminal through calculation based on the serving cell parameter of the relay terminal (for example, a parameter such as default DRX, N, Ns, and PF_offset corresponding to the serving cell), an S-TMSI of the remote terminal, and specific DRX of the remote terminal, and sends the first PF and the first PO that are obtained through calculation and third identifier information of the remote terminal to the relay terminal. The third identifier information of the remote terminal may be one or more of a destination identifier (ID) of the remote terminal, an IP address, the S-TMSI of the remote terminal (where the remote terminal is in the idle state), the I-RNTI of the remote terminal (where the remote terminal is in the inactive state), and the like. It should be understood that, in some implementations, the relay terminal may further obtain the third identifier information of the remote terminal (for example, where the unicast setup request sent by the remote terminal to the relay terminal carries the third identifier information of the remote terminal) in a process of establishing the unicast connection to the remote terminal, or determine the third identifier information (for example, an IP address) of the remote terminal by using a packet from the remote terminal. The destination ID of the remote terminal may be a destination layer 2 (L2) ID that corresponds to the remote terminal and that is used by the relay terminal to send the message to the remote terminal.

After receiving the first PF and the first PO from the remote terminal, the relay terminal associates (in other words, binds) the first PF and the first PO with the third identifier information of the remote terminal. It may be understood that, when the relay terminal is connected to a plurality of remote terminals, and first PFs and first POs of the plurality of remote terminals are the same, the relay terminal may associate third identifier information of the plurality of remote terminals under the same first PFs and first POs.

In some implementations, after receiving a first PF and a first PO from the remote terminal, the relay terminal sends the first PF and the first PO to the second network device corresponding to the relay terminal, to notify the second network device of a paging message of the remote terminal monitored by the relay terminal on the first PO of the first PF. In addition, if a first PF and a first PO that are sent by a newly added remote terminal to the relay terminal are the same as the first PF and the first PO that are maintained by the existing relay terminal, that is, the relay terminal has reported (in other words, sent) the first PF and the first PO to the second network device, to reduce signaling overheads, the relay terminal does not report the first PF and the PO to the second network device any more. In addition, after the remote terminal is disconnected from the relay terminal, the relay terminal may further delete the association relationship between the third identifier information of the remote terminal and the first PF and the first PO.

After the second network device corresponding to the relay terminal receives the first paging message sent by the first network device (the network device corresponding to the remote terminal, for example, a network device that last serves the remote terminal before the remote terminal enters the inactive state from the active state, which may also be referred to as an anchor network device of the remote terminal), or receives the first paging message sent by the first core network device (the core network device corresponding to the remote terminal, for example, an AMF network element corresponding to the remote terminal), based on the PF and the PO of the first paging message and the first PF and the first PO that are reported by the relay terminal, a relay terminal to which the first paging message or dedicated signaling including the first paging message needs to be sent may be determined.

After obtaining the first paging message through monitoring on the first PF and the first PO, the relay terminal sends, based on (one or more pieces of) third identifier information associated with the first PF and the first PO, the first paging message to (one or more) remote terminal devices corresponding to the third identifier information, to page the remote terminal.

Scenario 2: The relay terminal monitors, on the second PO of the second PF of the relay terminal, the first paging message used for paging the remote terminal.

Figure 10A:
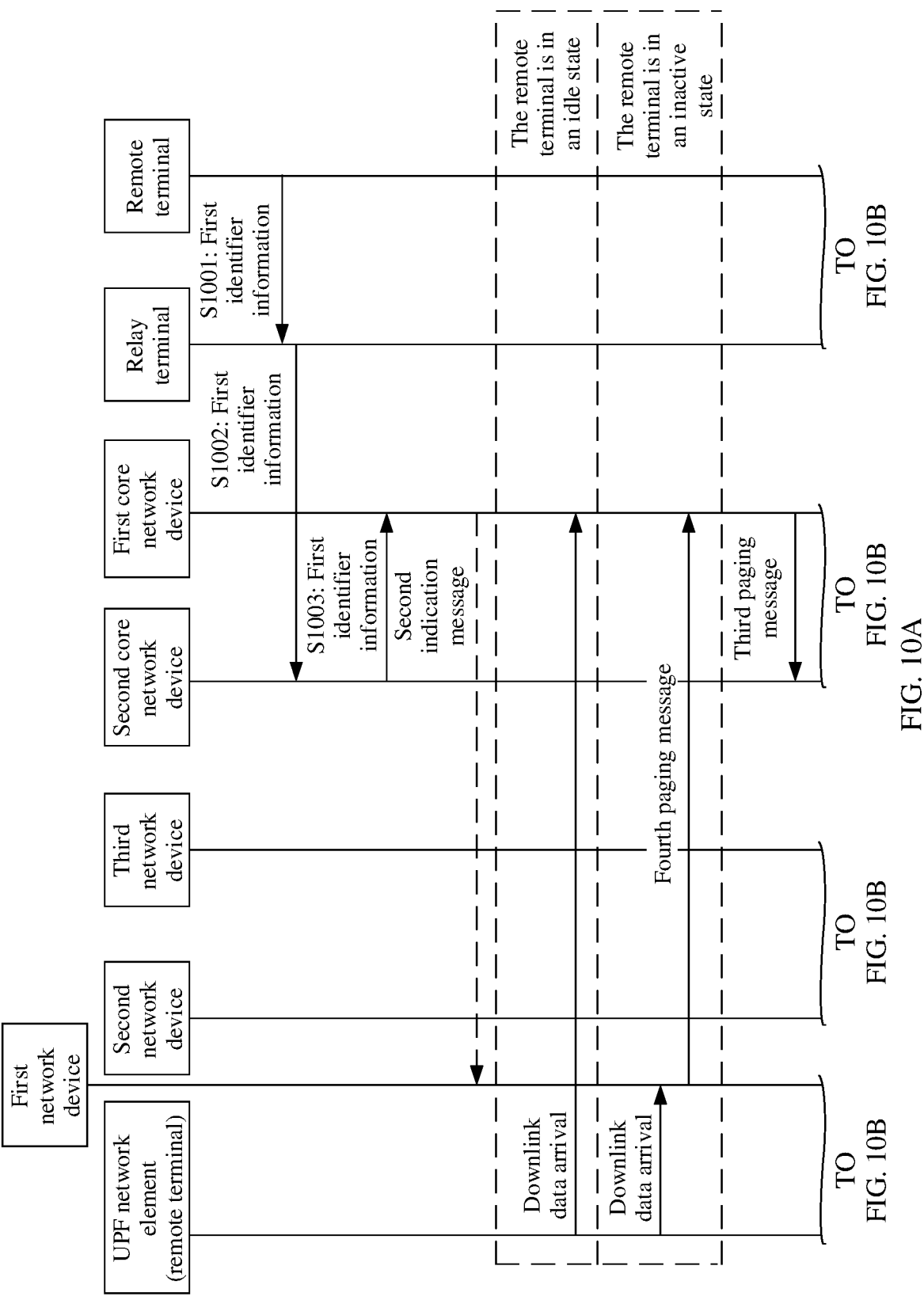
FIG. 10A and FIG. 10B are a schematic diagram 3 of a communication process according to an embodiment of this application.
Figure 10B:
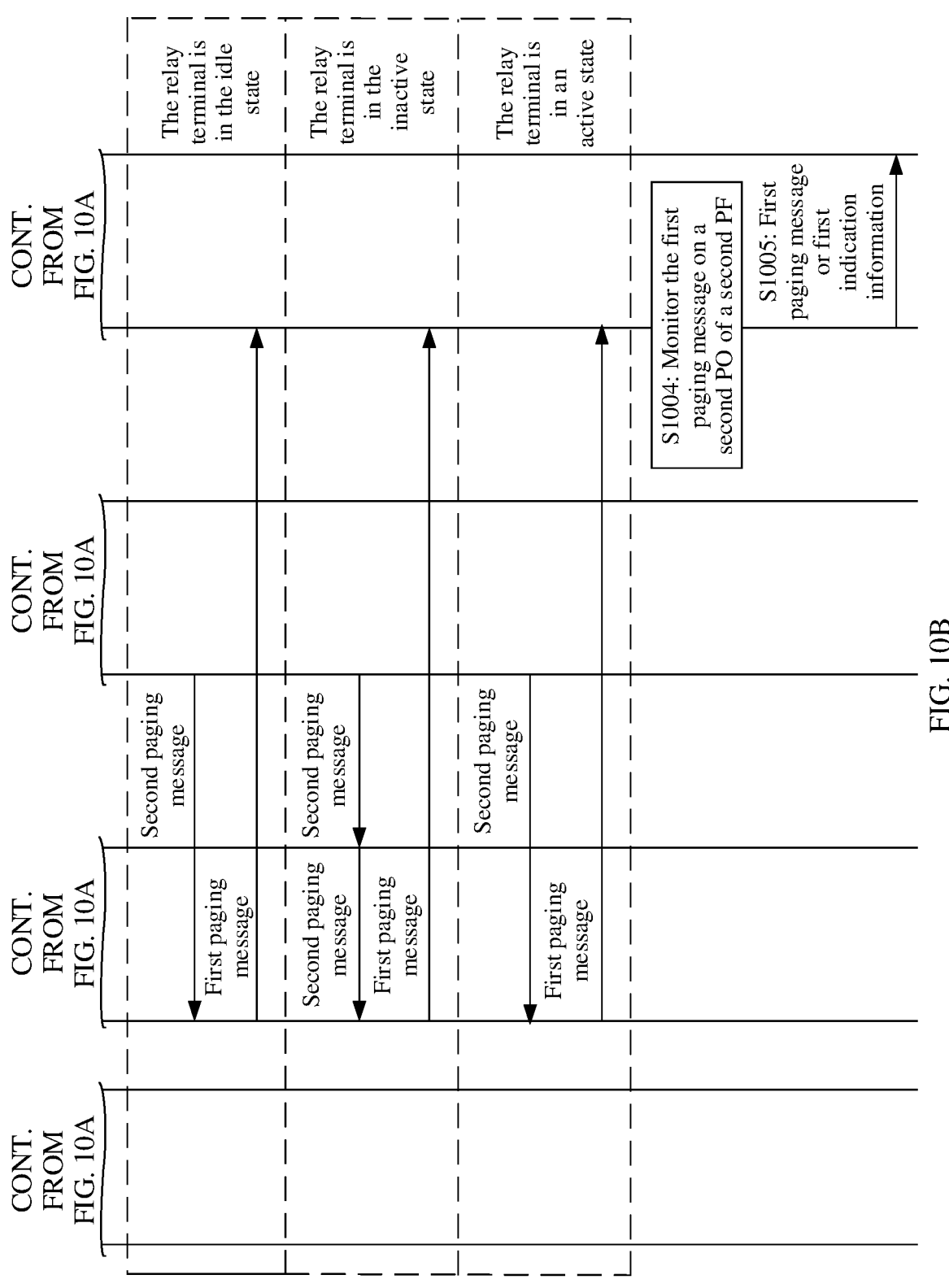

FIG. 10A and FIG. 10B are a schematic diagram of a communication process according to an embodiment of this application. The process includes the following steps:

S1001: A remote terminal sends first identifier information of the remote terminal to a relay terminal, and the relay terminal receives the first identifier information.

In this embodiment of this application, for an implementation in which the remote terminal sends the first identifier information of the remote terminal to the relay terminal, refer to embodiment 1. Details are not described again.

For obtaining of the second PF and the second PO of the relay terminal, the relay terminal may perform determining through calculation based on a serving cell parameter of the relay terminal and an S-TMSI of the relay terminal. For a specific calculation process, refer to a description part of the PF and the PO in this application. Details are not described again.

S1002: The relay terminal sends the first identifier information to a second core network device (a core network device corresponding to the relay terminal), and the second core network device determines to initiate paging to the remote terminal by using the relay terminal.

S1003: The second core network device sends the first identifier information to a first core network corresponding to the remote terminal, and the first core network device determines to initiate paging to the remote terminal by using the relay terminal.

When the relay terminal monitors, on the second PO of the second PF of the relay terminal, a first paging message used for paging the remote terminal, the core network device corresponding to the relay terminal (the second core network device) and the core network device corresponding to the remote terminal (the first core network device) need to sense a connection relationship between the relay terminal and the remote terminal. Therefore, when monitoring, on the second PO of the second PF of the relay terminal, the first paging message used for paging the remote terminal, after receiving the first identifier information of the remote terminal, the relay terminal sends the first identifier information to the second core network device (for example, an AMF network element corresponding to the relay terminal), so that the second core network device senses the connection relationship between the remote terminal and the relay terminal, and determines to initiate the paging to the remote terminal by using the relay terminal.

Similarly, to help the first core network device learn of the connection relationship between the remote terminal and the relay terminal, the second core network device may send the first identifier information of the remote terminal to the first core network device, so that the first core network device senses the connection relationship between the remote terminal and the relay terminal, and determines to initiate the paging to the remote terminal by using the relay terminal. Optionally, the second core network device may alternatively send the first identifier information of the remote terminal and second identifier information of the relay terminal to the first core network device, where the second identifier information includes at least one of the S-TMSI or an I-RNTI of the relay terminal, so that the first core network device senses the connection relationship between the remote terminal and the relay terminal, and determines to initiate the paging to the remote terminal by using the relay terminal.

When the remote terminal is in an inactive state, paging to the remote terminal is initiated by a first network device (the network device corresponding to the remote terminal). To help the first network device learn of the connection relationship between the remote terminal and the relay terminal, the first core network device may further send a second indication message to the first network device. The second indication message carries the first identifier information, and indicates the first network device to initiate paging to the remote terminal by using the first core network device.

S1004: The relay terminal monitors the first paging message including the first identifier information on a second PO of a second PF of the relay terminal.

Based on different RRC connected states between the relay terminal and the remote terminal, paging the remote terminal on the second PO of the second PF of the relay terminal has the following six cases.

Case 1: The remote terminal is in an idle state, and the relay terminal is in the idle state.

Case 2: The remote terminal is in an idle state, and the relay terminal is in the inactive state.

Case 3: The remote terminal is in an idle state, and the relay terminal is in the active state.

Case 4: The remote terminal is in the inactive state, and the relay terminal is in an idle state.

Case 5: The remote terminal is in the inactive state, and the relay terminal is in the inactive state.

Case 6: The remote terminal is in the inactive state, and the relay terminal is in an active state.

For Case 1, Case 2, and Case 3, when downlink data arrives, each of the remote terminals is in the idle state, and the first core network device (the core network device corresponding to the remote terminal, for example, an AMF network element corresponding to the remote terminal) initiates the paging to the remote terminal. After identifying an arrival indication of the downlink data of a UPF network element, the first core network device first sends a third paging message including the first identifier information (for example, the S-TMSI) of the remote terminal to the second core network device (the core network device corresponding to the relay terminal, for example, the AMF network element corresponding to the relay terminal). After receiving the third paging message, the second core network device needs to search for the relay terminal. Based on an RRC connected state of the relay terminal, there are the following differences:

1. When the relay terminal is in the idle state, the second core network device initiates paging to the relay terminal, to be specific, sends, to all network devices in a tracking area (TAI list) corresponding to the relay terminal, a second paging message including the first identifier information and the second identifier information of the relay terminal. After receiving the second paging message, the second network device (a network device corresponding to the relay terminal) may send the first paging message including the first identifier information to all terminals in a related cell of the second network device, in other words, may send the first paging message including the first identifier information to the relay terminal on the second PF and the second PO of the relay terminal.

2. When the relay terminal is in the inactive state, a third network device (a network device corresponding to the relay terminal, for example, a network device that last serves the relay terminal before the relay terminal enters the inactive state from the active state (which may also be referred to as a network device before a connection is released, anchor network device)) initiates paging to the relay terminal. The second core network device sends a second paging message including the first identifier information and the second identifier information of the relay terminal to the third network device (the network device before the connection of the relay terminal is released). If failing to find the relay terminal, the third network device sends the second paging message including the first identifier information and the second identifier information of the relay terminal to all network devices in a RAN-based notification area in which the relay terminal is located. After receiving the second paging message, the second network device (a network device corresponding to the relay terminal) may send the first paging message including the first identifier information to all terminals in a related cell of the second network device, in other words, may send the first paging message including the first identifier information to the relay terminal on the second PF and the second PO of the relay terminal.

3. When the relay terminal is in the active state, the second core network device may directly send a second paging message including the first identifier information and the second identifier information of the relay terminal to a second network device (a network device corresponding to the relay terminal, for example, a network device that provides a service for the relay terminal). After receiving the second paging message, the second network device may send the first paging message including the first identifier information to the relay terminal, in other words, may send the first paging message including the first identifier information to the relay terminal on the second PF and the second PO of the relay terminal, or may send, by using an RRC message, the first paging message including the first identifier information to the relay terminal.

For Case 4, Case 5, and Case 6, when downlink data arrives, each of the remote terminals is in the inactive state, and the first network device corresponding to the remote terminal (the network device corresponding to the remote terminal, for example, a network device that last serves the remote terminal before the remote terminal enters the inactive state from the active state, which may also be referred to as an anchor (anchor) network device of the remote terminal) initiates paging to the remote terminal. If the first network device intends to find the remote terminal, the first core network device needs to be passed through. When initiating the paging to the remote terminal, the first network device sends, to the first core network device, a fourth paging message including the first identifier information (for example, the I-RNTI) of the remote terminal. The second core network device continues to initiate paging to the remote terminal, for example, sends a third paging message including the first identifier information (for example, the I-RNTI) of the remote terminal to the second core network device. Specifically, for an implementation in which the second core network device continues to initiate the paging to the remote terminal, refer to descriptions in Case 1, Case 2, and Case 3. Details are not described again.

Certainly, when the first network device of the remote terminal (the network device before a connection is released, namely, an anchor network device of the remote terminal) learns of the connection relationship between the remote terminal and the relay terminal and a cell identifier of the relay terminal, the first network device may alternatively directly find the second network device (the network device corresponding to the relay terminal), and send the fourth paging message including the first identifier information to the second network device, and the second network device sends the first paging message including the first identifier information to the relay terminal, and further initiates paging to the remote terminal.

S1005: When the relay terminal obtains the first paging message through monitoring, the relay terminal sends the first paging message to the remote terminal or sends first indication information to the remote terminal, where the first indication information indicates that the remote terminal is paged.

In this embodiment of this application, for an implementation in which the relay terminal sends the first paging message to the remote terminal or sends the first indication information to the remote terminal, and an implementation in which the relay terminal determines whether to continue to monitor the first paging message used for paging the remote terminal, refer to descriptions in embodiment 1. Details are not described again.

The foregoing mainly describes the solutions provided in this application from perspectives of the relay terminal, the remote terminal, the first core network device, the second core network device, and the second network device. It may be understood that, to implement the foregoing functions, each network element includes a corresponding hardware structure and/or software module (or unit) for performing each function. A person skilled in the art should be easily aware that with reference to units and algorithm steps in the examples described in embodiments disclosed in this specification, this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 11:
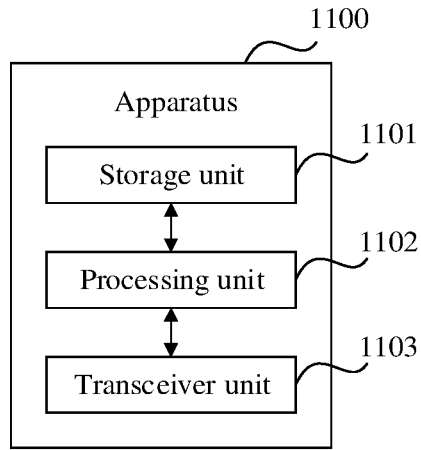
FIG. 11 is a schematic block diagram 1 of a communication apparatus according to an embodiment of this application.

FIG. 11 is a possible example block diagram of a communication apparatus according to an embodiment of this application. The communication apparatus may be applied to a case in which an integrated unit (module) is used. For example, the communication apparatus 1100 may alternatively exist in a form of software. The apparatus 1100 may include a processing unit 1102, and may further include a transceiver unit 1103.

In a possible design, the processing unit 1102 is configured to implement a corresponding processing function. The transceiver unit 1103 is configured to support the apparatus 1100 in communicating with another network entity. Optionally, the transceiver unit 1103 may include a receiving unit and/or a sending unit, which are respectively configured to perform a receiving operation and a sending operation. Optionally, the apparatus 1100 may further include a storage unit 1101, configured to store program code and/or data of the apparatus 1100. The apparatus 1100 may be the relay terminal or the remote terminal in any one of the foregoing embodiments, or may be a component such as a chip disposed in the relay terminal or the remote terminal.

For example, in an embodiment, the transceiver unit 1103 is configured to receive first identifier information from a remote terminal, where when the remote terminal is in an idle state, the first identifier information includes an S-temporary mobile subscriber identity S-TMSI of the remote terminal, and when the remote terminal is in an inactive state, the first identifier information includes an inactive radio network temporary identifier I-RNTI of the remote terminal.

The transceiver unit 1103 is further configured to, when obtaining, through monitoring, a first paging message including the first identifier information, send the first paging message to the remote terminal or send first indication information to the remote terminal, where the first indication information indicates that the remote terminal is paged.

In a possible design, the transceiver unit 1103 is further configured to monitor the first paging message on a first paging occasion PO of a first paging frame PF of the remote terminal, where the processing unit 1102 is configured to determine the first PF and the first PO of the remote terminal based on a serving cell parameter of the processing unit, the S-TMSI of the remote terminal, and a specific DRX cycle of the remote terminal. Alternatively, the transceiver unit 1103 is further configured to send a serving cell parameter to the remote terminal; and receive the first PF and the first PO of the remote terminal that are sent by the remote terminal, where the first PF and the first PO of the remote terminal are determined by the remote terminal based on the serving cell parameter, the S-TMSI of the remote terminal, and a specific DRX cycle of the remote terminal.

In a possible design, the transceiver unit 1103 is further configured to send the first PF and the first PO to a second network device corresponding to the transceiver unit.

In a possible design, when no data scheduling is performed on the first PO of the first PF, the transceiver unit 1103 is specifically configured to monitor the first paging message on the first PO of the first PF.

In a possible design, the transceiver unit 1103 is further configured to, when monitoring the first paging message on a second PO of a second PF of the transceiver unit, send the first identifier information to a second core network device corresponding to the transceiver unit.

In a possible design, the transceiver unit 1103 is further configured to, when the relay terminal is in a radio resource control RRC connected state and an active BWP does not cover an initial BWP, switch a configured BWP from the active BWP to the initial BWP before monitoring the first paging message on the first PO of the first PF of the remote terminal.

In a possible design, when switching the configured BWP from the active BWP to the initial BWP, the transceiver unit 1103 is specifically configured to switch the configured BWP from the active BWP to the initial BWP in advance based on BWP switching duration.

In a possible design, before switching the configured BWP from the active BWP to the initial BWP, the transceiver unit 1103 is further configured to send the BWP switching duration of the relay terminal to the second network device corresponding to the relay terminal.

In a possible design, when sending the first paging message to the remote terminal, the transceiver unit 1103 is specifically configured to send the first paging message to the remote terminal in a form of broadcast, multicast, or unicast.

In a possible design, the first paging message is a PC5-RRC message or a PC5-S message. Alternatively, the first paging message is carried in a PC5-RRC message or a PC5-S message. The first indication information is sent by using PC5 MAC CE information, the PC5-RRC message, or the PC5-S message.

In another embodiment, the transceiver unit 1103 is configured to send first identifier information of the transceiver unit to a relay terminal, where when the transceiver unit is in an idle state, the first identifier information includes an S-temporary mobile subscriber identity S-TMSI of the transceiver unit, and when the transceiver unit is in an inactive state, the first identifier information includes an inactive radio network temporary identifier I-RNTI of the transceiver unit.

The transceiver unit 1103 is further configured to: receive a first paging message that is sent by the relay terminal and that includes the first identifier information, or receive a first indication information from the relay terminal, where the first indication information indicates that the transceiver unit is paged.

In a possible design, the transceiver unit 1103 is further configured to: receive a serving cell parameter from the relay terminal; and send a first paging frame PF and a first paging occasion PO to the relay terminal, where the first PF and the first PO are determined by the processing unit 1102 based on the serving cell parameter of the relay terminal and the S-TMSI and a specific DRX cycle of the transceiver unit.

In a possible design, when receiving the first paging message that is sent by the relay terminal and that includes the first identifier information, the transceiver unit 1103 is specifically configured to receive, in a form of broadcast, multicast, or unicast, the first paging message that is sent by the relay terminal and that includes the first identifier information.

In a possible design, the first paging message is a PC5-RRC message or a PC5-S message. Alternatively, the first paging message is carried in a PC5-RRC message or a PC5-S message. The first indication information is sent by using PC5 MAC CE information, the PC5-RRC message, or the PC5-S message.

In another embodiment, the transceiver unit 1103 is configured to receive a first paging frame PF and a first paging occasion PO of a remote terminal that are sent by the remote terminal.

The processing unit 1102 is configured to associate the first PF and the first PO with third identifier information of the remote terminal.

The transceiver unit 1103 is further configured to, when obtaining, through monitoring, a first paging message on the first PO of the first PF, send the first paging message to the remote terminal corresponding to the third identifier information associated with the first PF and the first PO.

In a possible design, the transceiver unit 1103 is further configured to send a serving cell parameter of the relay terminal to the remote terminal.

In a possible design, the transceiver unit 1103 is further configured to send the first PF and the first PO to a second network device corresponding to the relay terminal.

In still another embodiment, the transceiver unit 1103 is configured to receive a serving cell parameter from a relay terminal.

The processing unit 1102 is configured to determine a first PF and a first PO based on the serving cell parameter of the relay terminal, an S-temporary mobile subscriber identity S-TMSI of the remote terminal, and a specific discontinuous reception DRX cycle of the remote terminal.

The transceiver unit 1103 is further configured to send the first PF and the first PO to the relay terminal.

Figure 12:
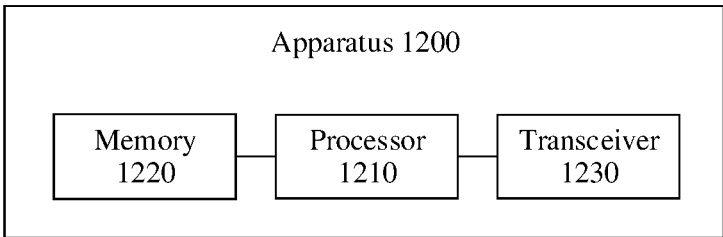
FIG. 12 is a schematic diagram 1 of a structure of a communication apparatus according to an embodiment of this application.

As shown in FIG. 12, an embodiment of this application further provides a communication apparatus 1200. The communication apparatus 1200 includes a processor 1210, and may further include a memory 1220 and/or a transceiver 1230.

In a possible design, the memory 1220 stores instructions, a program, or data, and the memory 1220 may be configured to implement a function of the storage unit 1101 in the foregoing embodiment. The processor 1210 is configured to read the instructions, the program, or the data stored in the memory 1220. When the instructions or the program stored in the memory 1220 is executed, the processor 1210 is configured to perform an operation performed by the processing unit 1102 in the foregoing embodiment, and the transceiver 1230 is configured to perform an operation performed by the transceiver unit 1103 in the foregoing embodiment.

In another form of this embodiment, a computer-readable storage medium is provided. The computer-readable storage medium stores a program or instructions. When the program or the instructions are executed, the method on a relay terminal side or a remote terminal side in the foregoing method embodiment may be performed.

In another form of this embodiment, a computer program product including instructions is provided. When the instructions are executed, the method on a relay terminal side or a remote terminal side in the foregoing method embodiment may be performed.

In another form of this embodiment, a chip is provided. The chip may implement the method on a relay terminal side or a remote terminal side in the foregoing method embodiment.

Figure 13:
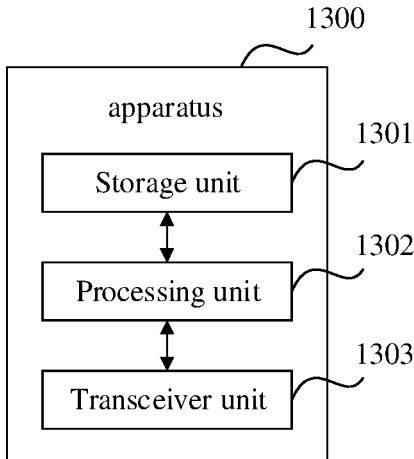
FIG. 13 is a schematic block diagram 2 of a communication apparatus according to an embodiment of this application.

When an integrated unit (module) is used, FIG. 13 is a possible example block diagram of a communication apparatus according to an embodiment of this application. The communication apparatus may be applied to a case in which the integrated unit (module) is used. For example, the communication apparatus 1300 may alternatively exist in a form of software. The apparatus 1300 may include a processing unit 1302, and may further include a transceiver unit 1303.

In a possible design, the processing unit 1302 is configured to implement a corresponding processing function. The transceiver unit 1303 is configured to support the apparatus 1300 in communicating with another network entity. Optionally, the transceiver unit 1303 may include a receiving unit and/or a sending unit, which are respectively configured to perform a receiving operation and a sending operation. Optionally, the apparatus 1300 may further include a storage unit 1301, configured to store program code and/or data of the apparatus 1300. The apparatus 1300 may be the second core network device or the first core network device in any one of the foregoing embodiments, or may be a component such as a chip disposed in the second core network device or the first core network device.

For example, in an embodiment, the transceiver unit 1303 is configured to receive a third paging message that is sent by a first core network device and that includes first identifier information of a remote terminal, where when the remote terminal is in an idle state, the first identifier information includes an S-temporary mobile subscriber identity S-TMSI of the remote terminal, and when the remote terminal is in an inactive state, the first identifier information includes an inactive radio network temporary identifier I-RNTI of the remote terminal.

The transceiver unit 1303 is further configured to send a second paging message including the first identifier information and second identifier information of a relay terminal to a second network device, where the second network device is a network device corresponding to the relay terminal, and the second identifier information includes at least one of an S-TMSI or an I-RNTI of the relay terminal.

In a possible design, the transceiver unit 1303 is further configured to receive the first identifier information sent by the relay terminal.

The processing unit 1302 is configured to determine to initiate paging to the remote terminal by using the relay terminal.

In a possible design, the transceiver unit 1303 is further configured to: send the first identifier information to the first core network device, or send the first identifier information and the second identifier information to the first core network device.

In a possible design, when sending the second paging message to the second network device, the transceiver unit 1303 is specifically configured to: directly send the second paging message to the second network device; or send the second paging message to a corresponding third network device before a connection of the relay terminal is released, where the third network device is configured to send the second paging message to the second network device.

In another embodiment, the transceiver unit 1303 is configured to send a third paging message including first identifier information of the remote terminal to the second core network device, where when the remote terminal is in an idle state, the first identifier information includes an S-temporary mobile subscriber identity S-TMSI of the remote terminal, and when the remote terminal is in an inactive state, the first identifier information includes an inactive radio network temporary identifier I-RNTI of the remote terminal, where the second core network device is a core network device corresponding to a relay terminal connected by the remote terminal.

In a possible design, the transceiver unit 1303 is further configured to, when the remote terminal is in the inactive state, receive a fourth paging message that is sent by a first network device and that includes the first identifier information of the remote terminal.

In a possible design, the transceiver unit 1303 is further configured to: receive the first identifier information sent by the second core network device, or receive the first identifier information and second identifier information of the relay terminal that are sent by the second core network device.

The processing unit 1302 is further configured to determine to initiate paging to the remote terminal by using the relay terminal.

In a possible design, the transceiver unit 1303 is further configured to, when the remote terminal is in the inactive state, send a second indication message to the first network device, where the second indication message carries the first identifier information, and indicates the first network device to initiate paging to the remote terminal by using the communication apparatus 1300.

Figure 14:
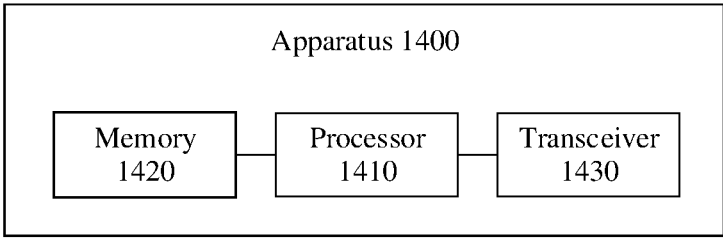
FIG. 14 is a schematic diagram 2 of a structure of a communication apparatus according to an embodiment of this application.

As shown in FIG. 14, an embodiment of this application further provides a communication apparatus 1400. The communication apparatus 1400 includes a processor 1410, and may further include a memory 1420 and/or a transceiver 1430.

In a possible design, the memory 1420 stores instructions, a program, or data, and the memory 1420 may be configured to implement a function of the storage unit 1301 in the foregoing embodiment. The processor 1410 is configured to read the instructions, the program, or the data stored in the memory 1420. When the instructions or the program stored in the memory 1420 is executed, the processor 1410 is configured to perform an operation performed by the processing unit 1302 in the foregoing embodiment, and the transceiver 1430 is configured to perform an operation performed by the transceiver unit 1303 in the foregoing embodiment.

In another form of this embodiment, a computer-readable storage medium is provided. The computer-readable storage medium stores a program or instructions. When the program or the instructions are executed, the method on a second core network device side or a first core network device side in the foregoing method embodiment may be performed.

In another form of this embodiment, a computer program product including instructions is provided. When the instructions are executed, the method on a second core network device side or a first core network device side in the foregoing method embodiment may be performed.

In another form of this embodiment, a chip is provided. The chip may implement the method on a second core network device side or a first core network device side in the foregoing method embodiment.

Figure 15:
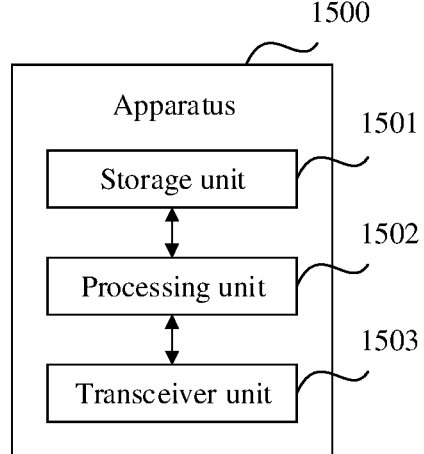
FIG. 15 is a schematic block diagram 3 of a communication apparatus according to an embodiment of this application.

When an integrated unit (module) is used, FIG. 15 is a possible example block diagram of a communication apparatus according to an embodiment of this application. The communication apparatus may be applied to a case in which the integrated unit (module) is used. For example, the communication apparatus 1500 may alternatively exist in a form of software. The apparatus 1500 may include a processing unit 1502, and may further include a transceiver unit 1503.

In a possible design, the processing unit 1502 is configured to implement a corresponding processing function. The transceiver unit 1503 is configured to support the apparatus 1500 in communicating with another network entity. Optionally, the transceiver unit 1503 may include a receiving unit and/or a sending unit, which are respectively configured to perform a receiving operation and a sending operation. Optionally, the apparatus 1500 may further include a storage unit 1501, configured to store program code and/or data of the apparatus 1500. The apparatus 1500 may be the second network device in any one of the foregoing embodiments, or may be component such as a chip disposed in the second network device.

For example, in an embodiment, the transceiver unit 1503 is configured to receive, from a second core network device, a second paging message including first identifier information of a remote terminal and second identifier information of a relay terminal, where when the remote terminal is in an idle state, the first identifier information includes an S-temporary mobile subscriber identity S-TMSI of the remote terminal, when the remote terminal is in an inactive state, first identifier information includes an inactive radio network temporary identifier I-RNTI of the remote terminal, and the second identifier information includes at least one of an S-TMSI or an I-RNTI of the relay terminal.

The transceiver unit 1503 is further configured to send the first paging message including the first identifier information to the relay terminal.

In a possible design, when sending the first paging message including the first identifier information to the relay terminal, the transceiver unit 1503 is specifically configured to send the first paging message including the first identifier information on a second PO of a second PF of the relay terminal, where the second PF and the second PO are determined based on the S-TMSI of the relay terminal and a DRX cycle of the relay terminal.

In a possible design, the second network device sends the first paging message including the first identifier information on a first PO of a first PF of the remote terminal, where the second network device receives the first PF and the first PO of the remote terminal that are sent by the relay terminal.

In another embodiment, the transceiver unit 1503 is configured to receive the first PF and the first PO of the remote terminal that are sent by the relay terminal.

The processing unit 1502 is configured to determine to skip performing data scheduling on the relay terminal on the first PO of the first PF.

In a possible design, the transceiver unit 1503 is further configured to receive BWP switching duration from the relay terminal.

The processing unit 1502 is configured to determine to skip performing data scheduling on the relay terminal within the BWP switching duration before the first PO of the first PF.

Figure 16:
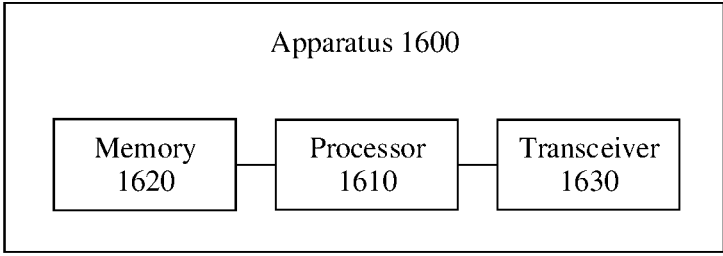
FIG. 16 is a schematic diagram 3 of a structure of a communication apparatus according to an embodiment of this application.

As shown in FIG. 16, an embodiment of this application further provides a second network device 1600. The second network device 1600 includes a processor 1610, and may further include a memory 1620 and/or a transceiver 1630.

In a possible design, the memory 1620 stores instructions, a program, or data, and the memory 1620 may be configured to implement a function of the storage unit 1501 in the foregoing embodiment. The processor 1610 is configured to read the instructions, the program, or the data stored in the memory 1620. When the instructions or the program stored in the memory 1620 is executed, the processor 1610 is configured to perform an operation performed by the processing unit 1502 in the foregoing embodiment, and the transceiver 1630 is configured to perform an operation performed by the transceiver unit 1503 in the foregoing embodiment.

In another form of this embodiment, a computer-readable storage medium is provided. The computer-readable storage medium stores a program or instructions. When the program or the instructions are executed, the method on a second network device side in the foregoing method embodiment may be performed.

In another form of this embodiment, a computer program product including instructions is provided. When the instructions are executed, the methods on a second network device side in the foregoing method embodiment may be performed.

In another form of this embodiment, a chip is provided. The chip may implement the method on a second network device side in the foregoing method embodiment.

It should be noted that, the processor in this embodiment of this application may be an integrated circuit chip, and has a signal processing capability. During implementation, steps in the foregoing method embodiments can be implemented by using a hardware integrated logical circuit in the processor, or by using instructions in a form of software. The processor may be a general purpose central processing unit (CPU), a general purpose processor, digital signal processor (DSP), an application-specific integrated circuit (ASIC), a field programmable gate array (FPGA) or another programmable logic device, a transistor logic device, a hardware component, or any combination thereof. The processor may be a combination of processors implementing a computing function, for example, a combination including one or more microprocessors, or a combination of the DSP and a microprocessor. The general purpose processor may be a microprocessor, or the processor may be any conventional processor or the like.

It may be understood that the memory or storage unit in this embodiment of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to these memories and any memory of another proper type.

All or some of the foregoing embodiments may be implemented by software, hardware, firmware, or any combination thereof. When software is used to implement embodiments, all or some of embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general purpose computer, a dedicated computer, a computer network, or another programmable apparatus. The computer programs or the instructions may be stored in a computer-readable storage medium, or may be transmitted by using a computer-readable storage medium. The computer-readable storage medium may be any usable medium accessible by the computer, or a data storage device such as a server integrating one or more usable media. The usable medium may be a magnetic medium, such as a floppy disk, a hard disk, or a magnetic tape; or may be an optical medium, for example, a DVD; or may be a semiconductor medium, for example, a solid-state disk (SSD).

The various illustrative logical units and circuits described in embodiments of this application may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may be integrated into the processor. The processor and the storage medium may be disposed in an ASIC, and the ASIC may be disposed in a terminal device. Optionally, the processor and the storage medium may alternatively be disposed in different components of a terminal device.

The computer program instructions may alternatively be loaded onto a computer or another programmable data processing device, so that a series of operations and steps are performed on the computer or another programmable device, to generate computer-implemented processing. Therefore, the instructions executed on the computer or the another programmable device provide steps for implementing a specified function in one or more procedures in the flowcharts and/or in one or more blocks in the block diagrams.

Although embodiments of this application are described with reference to specific features, it is clear that various modifications and combinations may be made to embodiments of this application without departing from the scope of embodiments of this application. Correspondingly, the specification and the accompanying drawings are merely example descriptions in embodiments of this application defined by the appended claims, and are intended to cover any of or all modifications, variations, combinations, or equivalents within the scope of embodiments of this application.

What is claimed is:

1. A method, comprising:

receiving, by a relay terminal, first identifier information from a remote terminal, wherein when the remote terminal is in an idle state, the first identifier information comprises an S-temporary mobile subscriber identity (S-TMSI) of the remote terminal, and when the remote terminal is in an inactive state, the first identifier information comprises an inactive radio network temporary identifier (I-RNTI) of the remote terminal;

monitoring, by the relay terminal, a first paging message on a first paging occasion (PO) of a first paging frame (PF) of the remote terminal, wherein when the relay terminal is in a radio resource control (RRC) connected state and an active bandwidth part (BWP) does not cover an initial BWP, before the monitoring, by the relay terminal, the first paging message on a first PO of a first PF of the remote terminal, the method further comprises:

switching, by the relay terminal, a configured BWP from the active BWP to the initial BWP, and wherein the relay terminal determines the first PF and the first PO of the remote terminal based on a serving cell parameter of the relay terminal, the S-TMSI of the remote terminal, and a specific discontinuous reception (DRX) cycle of the remote terminal; and in response to determining that the relay terminal has obtained, through the monitoring, the first paging message comprising the first identifier information, sending first indication information to the remote terminal using a PC5-RRC message, wherein the first indication information indicates that the remote terminal is paged.

2. The method according to claim 1, wherein the method further comprises:

sending, by the relay terminal, the first PF and the first PO to a second network device corresponding to the relay terminal.

3. The method according to claim 1, wherein when no data scheduling is performed on the first PO of the first PF, the relay terminal monitors the first paging message on the first PO of the first PF.

4. An apparatus, comprising:

at least one processor, and a memory storing instructions for execution by the at least one processor;

wherein, when executed, the instructions cause the apparatus to perform operations comprising:

receiving first identifier information from a remote terminal, wherein when the remote terminal is in an idle state, the first identifier information comprises an S-temporary mobile subscriber identity (S-TMSI) of the remote terminal, and when the remote terminal is in an inactive state, the first identifier information comprises an inactive radio network temporary identifier (I-RNTI) of the remote terminal;

monitoring a first paging message on a first paging occasion (PO) of a first paging frame (PF) of the remote terminal, wherein, when the apparatus is in a radio resource control (RRC) connected state and an active bandwidth (BWP) does not cover an initial BWP, before the monitoring the first paging message on a first PO of a first PF of the remote terminal, the operations further comprising:

switching a configured BWP from the active BWP to the initial BWP, and wherein the apparatus determines the first PF and the first PO of the remote terminal based on a serving cell parameter of the apparatus, the S-TMSI of the remote terminal, and a specific discontinuous reception (DRX) cycle of the remote terminal; and in response to determining that the apparatus obtains, through the monitoring, the first paging message comprising the first identifier information, sending first indication information to the remote terminal using a PC5-RRC message, wherein the first indication information indicates that the remote terminal is paged.

5. The apparatus according to claim 4, the operations further comprising:

sending the first PF and the first PO to a second network device corresponding to the apparatus.

6. The apparatus according to claim 4, wherein when no data scheduling is performed on the first PO of the first PF, the apparatus monitors the first paging message on the first PO of the first PF.

7. An apparatus, comprising:

at least one processor, and a memory storing instructions for execution by the at least one processor;

wherein, when executed, the instructions cause the apparatus to perform operations comprising:

sending first identifier information of the apparatus to a relay terminal, wherein when the apparatus is in an idle state, the first identifier information comprises an S-temporary mobile subscriber identity (S-TMSI) of the apparatus, and when, the apparatus is in an inactive state, the first identifier information comprises an inactive radio network temporary identifier (I-RNTI) of the apparatus, wherein the first identifier information causes the relay terminal to perform:

monitoring a first paging message on a first paging occasion (PO) of a first paging frame (PF) of the apparatus, wherein when the relay terminal is in a radio resource control (RRC) connected state and an active bandwidth part (BWP) does not cover an initial BWP, before the monitoring the first paging message on a first PO of a first PF of the apparatus, the relay terminal switches a configured BWP from the active BWP to the initial BWP, and wherein the relay terminal determines the first PF and the first PO of the apparatus based on a serving cell parameter of the relay terminal, the S-TMSI of the apparatus, and a specific discontinuous reception (DRX) cycle of the apparatus; and in response to that the relay terminal has obtained, through the monitoring, the first paging message comprising the first identifier information, receiving first indication information from the relay terminal using a PC5-RRC message, wherein the first indication information indicates that the apparatus is paged.

8. The method of claim 1, further comprising:

performing, by the relay terminal, BWP adjustment to monitor the first paging message for the remote terminal.

* * * * *